(12) United States Patent
Masten et al.

(10) Patent No.: US 7,578,939 B2
(45) Date of Patent: Aug. 25, 2009

(54) CERAMIC MEMBRANE WATER FILTRATION

(75) Inventors: Susan J. Masten, East Lansing, MI (US); Simon H. R. Davies, East Lansing, MI (US); Melissa Baumann, East Lansing, MI (US); Bhavana Karnik, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 97 days.

(21) Appl. No.: 11/294,812

(22) Filed: Dec. 6, 2005

(65) Prior Publication Data

US 2006/0175256 A1 Aug. 10, 2006

Related U.S. Application Data

(60) Provisional application No. 60/656,983, filed on Feb. 28, 2005, provisional application No. 60/634,707, filed on Dec. 9, 2004.

(51) Int. Cl.
B01D 39/00 (2006.01)
B01D 39/06 (2006.01)
B01D 29/00 (2006.01)
B01D 63/00 (2006.01)

(52) U.S. Cl. .................. 210/500.25; 210/490; 210/652; 55/523; 55/524; 264/41

(58) Field of Classification Search .............. 210/490, 210/500.25, 652; 55/523, 524; 95/55; 428/312.2; 264/41; 585/818
See application file for complete search history.

(56) References Cited

U.S. PATENT DOCUMENTS

| | | | | |
|---|---|---|---|---|
| 4,699,720 A | * | 10/1987 | Harada et al. | 210/762 |
| 5,250,184 A | * | 10/1993 | Maier | 210/653 |
| 5,342,431 A | * | 8/1994 | Anderson et al. | 95/45 |
| 6,464,881 B2 | * | 10/2002 | Thoraval | 210/652 |
| 6,649,255 B1 | * | 11/2003 | Fain et al. | 428/312.2 |
| 7,112,237 B2 | * | 9/2006 | Zeller et al. | 95/273 |
| 7,306,642 B2 | * | 12/2007 | Hayward et al. | 55/523 |

OTHER PUBLICATIONS

Allemane, H., et al., (1993). Ozone: Science and Engineering, 15(5), 419-432.
Beltran, F.J., et al., (2003a) Industrial and Engineering Chemistry Research. 42(14), 3210-3217.
Beltran, F.J., et al. (2003b) Industrial and Engineering Chemistry Research. 42(14), 3218-3224.
Beltran, F.J., et al., (2005) Water Research 39, 3553-3564.
Castro, K., et al., (1990) Journal of American Water Works Association, 87(3), 50-61.
Ernst, M., et al., (2004) Applied Catalysis B: Environmental, 47(1), 15-25.
Gracia, R., et al., (1996) Ozone: Science and Engineering, 18(3), 195-208.

(Continued)

*Primary Examiner*—Ana M Fortuna
(74) *Attorney, Agent, or Firm*—Ian C. McLeod

(57) ABSTRACT

A process for combined ozone degradation and filtration using a multi-layered, nanocrystalline, sintered ceramic, metal oxide catalyst and ceramic membrane filter is described. The process reduces fouling of the membrane and degrades ozone remaining in the water from ozonation of water to kill microorganisms.

13 Claims, 10 Drawing Sheets

OTHER PUBLICATIONS

Gracia, R., et al., (2000a) Ozone: Science and Engineering, 22(2), 185-193.
Gracia, R., et al., (2000b) Ozone: Science and Engineering, 22(5), 461-471.
Hashino, M., et al., (2000) Water Science and Technology, 41(10-11), 17-23.
Huang, W.H., et al, (2005) Colloids and Surfaces A: Physico chemical and Engineering Aspects, 260, 45-51.
Kim, J.O., et al., (2001) Environment and Technology, 22(1): 7-15.
Kim, J.O., et al., (1999) In the Proceedings of the 14th Ozone World Congress, Dearborn, MI, 131-143.
Legube, B., et al., (1999) Catalysis Today, 53, 61-72.
McKenzie, K.J., et al., (2002) New Journal of Chemistry, 26, 625-629.
Mulvaney, P., et al., (1998) Langmuir, 4, 1206-1211.
Ni, C.H., et al., (2001) Water Science and Technology, 43(2), 213-220.
Paillard, H., et al., (1991) In the Proceedings of the 10th Ozone World Congress (IOA), Monaco, 313-329.
Park, J.S., et al., (2004) Water Research, 38, 2284-2291.
Pines, D.S., et al., (2003) Ozone: Science and Engineering, 25(1), 25-39.
Radhakrishnan, R., (2001) Journal of Catalysis, 199(2), 282-290.
Sawada, S., et al., (2001) Water Science and Technology, 1(5-6), 141-150.
Schlichter, B., et al., (2004) Desalination, 168, 307-317.
Shanbhag, P.V., (1998) Industrial and Engineering Chemistry Research, 37(11), 4388-4398.
Shen, Z.S., et al., (1990) Environmental Technology, 11, 597-608.
Shioyama, M. et al., (2001) Water Science and Technology, 1(5-6), 91-96.
Tsuru, T. et al., (2001) Journal of Chemical Engineering of Japan, 34(6), 844-847.
Tsuru, T. et al., (2001) Separation and Purification Technology, 25(1-3), 307-314.
Trapido, M. et al., (2005) Ozone: Science and Engineering, 27, 359-363.
Karnik, B.S. et al., (2005) Water Research, 39(4), 728-734.
Karnik, B.S. et al., (2005b) Water Research, 39(13), 2839-2850.
Karnik, B.S. et al., (2005c) Environmental Science and Technology, 39, 7656-7661.
Karnik, B.S. et al., Removal and Survival of Bacteria after Treatment using Ozonation-Ultrafiltrationwith Iron Oxide Caoted Membranes, Revisions submitted to Ozone Science and Engineering, May 2006.
Karnik, B.S., et al., TEM Characterization of Iron Oxide Coated Ceramic Membranes, Manuscript in preparation for submission to Journal of Materials Science, 2006.
Karnik, B.S., et al., Use of salicylic acid as a model compound to investigate hydroxyl radical reaction in ozonation-membranefiltration hybrid process, Manuscript in preparation for submission to Environmental Engineering and Science, 2006.

\* cited by examiner

CERAMIC MEMBRANE WATER FILTRATION

CROSS-REFERENCE TO RELATED APPLICATIONS

This application claims priority to Provisional application Ser. No. 60/634,707, filed Dec. 9, 2004 and Ser. No. 60/656,983, filed Feb. 28, 2005.

STATEMENT REGARDING GOVERNMENT RIGHTS

This invention was developed under a grant from the U.S. Environmental Protection Agency Grant No. RD830090811. The U.S. Government has certain rights in this invention.

STATEMENT REGARDING FEDERALLY SPONSORED RESEARCH OR DEVELOPMENT

Not Applicable

BACKGROUND OF THE INVENTION (1) Field of the Invention

The present invention relates to a composite filter for water purification and filtration. In particular, the present invention comprises a ceramic filter coated with a multi-tapered nanocrystalline, sintered, metal oxide catalyst for degrading remaining ozone in the water used to kill microorganisms.

TABLE 1

Abbreviations

| | |
|---|---|
| DI | Deionized water |
| FP | Forming precursors or forming potential |
| THM | Trihalomethane |
| HAA | Haloacetic acid |
| TOC | Total organic carbon |
| NOM | Natural organic material |
| NF | Nanofiltration |
| MF | Microfiltration |
| UF | Ultrafiltration |
| DBP | Disinfection by-products |
| HS | Humic substances |
| NHS | Non-humic substances |
| DOC | Decomposition Organic Compounds |
| BDOC | Biodegradable Decomposition Organic Products |
| MWO | Molecular Weight Cutoff |
| SWTR | Surface Water Treatment Rule |
| P/DBP | Microbial Disinfection By-Products |
| RO | Reverse Osmosis |
| SEM | Scanning Electron Microscope |

(2) Description of the Related Art

As a result of the Surface Water Treatment Rule (SWTR) promulgated in 1989 and the Long Term 2 ESWTR Agreement in Principle signed by the US EPA and the members of the Microbiol-Disinfection Byproducts Rule (D/DBP) Cluster Federal Advisory Committee Act (FACA) Committee (65 FR 83015), water utilities are required to achieve up to 2.5-log inactivation and/or removal of *Cryptosporidium* sp. beyond conventional treatment. As a result, at least 119 utilities in the U.S. are using microfiltration (MF) or ultrafiltration (UF) (USEPA. Low-Pressure Membrane Filtration for Pathogen Removal: Application, Implementation and Regulatory Issues. Office of Water. 815-C-01-001. April 2001 (2001a)) for the removal of pathogens and particles from surface water or groundwater under the influence of surface water.

Membrane filtration is considered as one of the best available technologies (BAT) for meeting the Stage 2 D/DBP requirements (Cleveland, C. T., Big Advantages in Membrane Filtration. *Jour*. AWWA, 91:6:10-10 (1999); Taylor, J. S., et al., Membranes. In *Water Quality and Treatment*. $5^{th}$ Ed., American Water Works Association, Ch. 11 (1999); Arora, H., et al., DBP Occurrence Survey. *Jour. AWWA.*, 89:6:60-68 (1997)). During the last decade, better membranes have been developed and the characterization of membrane surfaces and causes of membrane fouling are better (although not completely) understood (AWWA Membrane Technology Research Committee, Committee Report: Membrane Processes. *Jour. AWWA.*, 90:6:91-105 (1998)). However, one of the major problems with membrane processes are the decrease in permeate flux, resulting from membrane fouling (e.g., see Cho, J., et al., Effects of Molecular Weight Cutoff, f/k ration (a Hydrodynamic condition)., and Hydrophobic Interactions on Natural Organic Matter Rejection and Fouling in Membranes. *J. Water Supply Res. and Technol.-AQUA*, 51:109-123 (2002); Lee, H., et al., Cleaning Strategies for Flux Recovery of an Ultrafiltration Membrane Fouled by Natural Organic Matter. Water Res. 35:3301-3308 (2001); Field, R. W., Mass Transport and the Design of Membrane Systems. *Industrial Membrane Separation Technology*, Scott, K. and Hughes, R., Eds., *Blackie Academic & Professional*, Glasgow, UK (1996)).

Although membrane filtration provides a barrier against pathogens and particles, disinfection after filtration is usually necessary to control bacterial regrowth on the filtrate side of the membrane (US EPA. Ibid; April 2001 (2001a)). As a result, the production of DBPs during the disinfection process can remain problematic (Miles, A. M., et al., Comparison of Trihalomethanes in Tap Water and Blood. *Environ. Sci. Techno.* 39:1692-1698 (2002); Morris, R. D., et al., Chlorination, Chlorination By-products, and Cancer: A Meta-analysis. *Am. Jour. Public Health*, 82:7:955-963 (1992); Mughal, F. H., Chlorination of Drinking Water and Cancer: A Review. *Jour. Envir. Pathol., Toxicol. & Oncol.*, 11(5,6):287-292 (1992); Kool, H. J., et al., Mutagenic and Carcinogenic Properties of Drinking Water. In *Water Chlorination: Chemistry, Environmental Impacts, and Health Effects*, Vol. 5, Jolley, R. L., Brungs, W. A., and Cumming, R. B., Eds., *Lewis Pub.*, Chelsea, Mich. (1985)). As the DBP regulations continue to become more stringent (US EPA 40 CFR Parts 9, 141, and 142. National Primary Drinking Water Regulations: Stage 2 Disinfection By-products Rule. Deliberative Draft, Oct. 17, 2001 (2001b); Pontius, F. W., Regulations in 2000 and Beyond. *Jour. AWWA.*, 92:3:40-54 (2000); Pontius, F. W., Complying with Future Water Regulations. *Jour. AWWA.*, 91:46-58 (1999); U.S. EPA. Disinfectants and Disinfection By-products, Final Rule. *Fed. Reg.*, 63:241:69394 (Dec. 16, 1998); Arora, H., et al., (Ibid; 1997), novel ways to further remove DBP precursors in order to meet the more stringent regulations concerning DBPs must be developed.

Membrane Filtration

The membrane process is an effective means for removing turbidity, organics, microorganisms, and DBP precursors to comply with the more stringent regulatory controls. Compared to conventional treatment, membrane processes i) provide high quality water, ii) minimize disinfectant demand, iii) are more compact, iv) provide easier operational control and less maintenance, and v) generate less sludge (Nakatsuka, S., et al., Drinking Water Treatment by Using Ultrafiltration Hollow Fiber Membranes. *Desalination*, 106:55-61 (1996).

The efficacy of membrane filtration varies widely with membrane type and source water. For example, Lâiné, J. M., et al., Influence of Bromide on Low-Pressure Membrane Filtration for Controlling DBPs in Surface Waters. *Jour. AWWA.*, 85:6:87-99 (1993), found that UF removed less than 15% of the TOC from three surface water samples taken in California and Ontario. Jacangelo, J. G., et al., UF with Pretreatment for Removing DBP Precursors. *Jour. AWWA.*, 87:3: 100-112 (1995), reported very low removals of trihalomethane (THM) and haloacetic acid (HAA) precursors and bromide by UF. On the contrary, Taylor, J., et al., Applying Membrane Processes to Groundwater Sources for Trihalomethane Precursor Control. *Jour. AWWA.*, 79:8:72-82 (1987), using two Floridian groundwaters that contained excessive THM precursors, and Fu, P., et al., Selecting Membranes for Removing NOM and DBP Precursors. *Jour. AWWA.*, 86:12: 55-72 (1994), using a ground water from southern California that contained high color and TOC, both reported that UF effectively rejected NOM during treatment.

Reverse osmosis (RO) has advantages compared to conventional drinking water treatment, but the costs are higher (Ericsson, B. and Hallmans, B., Membrane Applications in Raw Water Treatment with and without Reverse-Osmosis Desalination. *Desalination*, 98(1-3): 3-16 (1994). Karakulski, K., et al., Pilot Plant Studies on the Removal of Trihalomethanes by Composite Reverse Osmosis Membranes. *Desalination*, 140:3:227-234 (2001) reported that over 80% of THMs were retained by RO membranes.

Several studies have demonstrated large removals of DBP precursors using nanofiltration (NF). Lâiné, J. M., et al., (Ibid; 1993) reported that NF membranes were effective at removing DBP precursors, but ineffective at removing bromide. Siddiqui, M., et al., Membranes for the Control of Natural Organic Matter from Surface Waters. *Wat. Res.*, 34:13:3355-3370 (2000) found that NF was much more effective at rejecting DBP precursors and bromide from low turbidity surface waters in Colorado than was either UF or microfiltration (MF). Similar observations were reported by Chellam, S. et al., Effect Operating Conditions and Pretreatment for Nanofiltration of Surface Water. In Proc. 1997 *Membrane Technology Conf.*, New Orleans, La., pp. 215-231 (1997a), Allgeier and Summers, Evaluating NF for DBP Control with the RBSMT. *Jour. AWWA.*, 87:3:87-99 (1995), Taylor et al., (Ibid; 1987) and by Lozier and Carlson, Organics Removal from Eastern U.S. Surface Waters Using Ultra-Low Pressure Membranes. In *Proc. 1991 Membrane Technologies in the Water Industry*, Orlando, Fla., pp. 521-543 (1991) when using ultra-low pressure membrane processes. Using a NF membrane to treat Colorado River water, Amy et al., Removal of Dissolved Organic Matter by Nanofiltration. *Jour. Of Environmental Engineering-ASCE.*, 116:1:200-205 (1990) observed a 65 to 70% reduction in trihalomethane formation potential (THMFP). Mulford et al., NF Performance at Full and Pilot Scale. *Jour. AWWA.*, 91:6:64-75 (1999) used MF or UF before NF to treat high TOC Floridian groundwater. High removal efficiencies of TOC, simulated distribution-THMFP (SDSTHMFP), simulated distribution-HAAFP (SDSHAAFP), and chlorine demand were achieved. Chellam et al., (Ibid; 1997a) observed that when water from the Occoquan Reservoir in Virginia was treated by MF followed by NF, all current and anticipated THM and HAA regulations were met. DiGiano, F. A., et al., Nanofiltration Fouling by Natural Organic Matter and Role of Particles in Flux Enhancement. *In Proc. 1993 Membrane Technology Conf.*, Baltimore, Md., pp. 273-291 (1993) suggested that pretreatment of the raw water before NF would be necessary in order to remove THM precursors effectively if the concentrations of THMFP in the raw water were higher than 100 µg/L.

In the vast majority of studies conducted, organic polymeric membranes were used. Although ceramic membranes are much more resistant to chemical oxidation and extreme temperature (Baker, R. W., *Membrane Technology and Application*. McGraw-Hill, New York (2000), their use in water treatment is relatively new. Wiesner et al., Permeation Behavior and Filtrate Quality of Tubular Ceramic Membranes Used for Surface Water Treatment. *In Proc.* 1991 *Membrane Technologies in the Water Industry*, Orlando, Fla., pp. 371-383 (1991) reported large removals of turbidity, UV-254, TOC and THMFP when using ceramic MF membranes (having pore diameters between 0.1 and 10 µm), with and without coagulation, as a pretreatment step for waters with moderate to high turbidities. Similar results were observed by Scanlan et al., Membrane Filtration for the Removal of Color and TOC from Surface Water. *In Proc.* 1997 *Membrane Technology Conf.*, New Orleans, La., pp. 127-141 (1997), when treating a low turbidity water, they found that UF was more effective at particle removal than MF, with or without chemical addition; however, the operation times of MF were much longer than those of UF. Lee et al., Evaluation of Ceramic Membrane Application for Drinking Water Treatment Based on NOM/Membrane Characteristics. In 2000 *Annual AWWA Conference*, Denver, Colo., USA (2000) found that the membranes with similar MWCO values, ceramic membranes were more efficient at removing NOM, HAAFP, and had higher permeability than polymeric membranes. The reduced fouling on ceramic membranes may be the result of the more hydrophilic nature of these membranes.

One of the major problems with membrane processes is the decrease in permeate flux due to membrane fouling. The fouling rates are influenced by the nature of the solutes, their concentrations, membrane type and pore size distribution, water quality, hydrodynamics and the surface characteristics of the membrane (e.g., see Cho et al., (Ibid; 2002); Lee et al., (Ibid; 2001); Field, R. W., (Ibid; 1996). Membrane fouling lowers the economic efficiency of membrane treatment by reducing the quality of treated water, shortens membrane life, and increases the frequency of membrane cleaning. The "fouled" state of the membrane and the characteristics of the foulants are believed to control the rejection of other ions by the membrane (Schafer, Fane and Waite, Fouling Effects on Rejection in the Membrane Filtration of Natural Waters. *Desalination*, 131:215-224 (2000).

Organic matter is often found to be a primary source of flux decline due to fouling of membrane systems (e.g., see Lee et al., (Ibid; 2001); Nilson and DiGiano, Influence of NOM Composition on Nanofiltration. *Jour. AWWA.*, 88:5:53-66 (1996); Ravindran et al., Crossflow Membrane Filtration for the Removal of Natural Organic Matter. In *Proc.* 1993 *Membrane Technology Conf.*, Baltimore, Md., pp. 587-599 (1993)). Fouling may be caused by the interaction of NOM with membrane surfaces or incorporation of the NOM into its porous support. DiGiano et al., Fouling of Nanofiltration Membranes by Natural Organic Matter. In *Proc.* 1994 *ASCE Natl. Conf. On Envir. Engr.*, Boulder, Colo. (1994) attributed the fouling of UF membranes to TOC with a molecular weight greater than 30,000 Da. Similar results were found by Lin et al., Effects of Humic Substance Characteristics on UF Performance. *Wat. Res.* 34:1097-1106 (2000), although they found that molecules in the molecular weight range of 6,500 to 22,600 Da caused the worst fouling. Aoustin et al., Ultrafiltration of Natural Organic Matter. *Sep. Purif. Technol.* 22-23:63-78 (2001) found that the larger and more UV-absorbing fraction of humic acid was responsible for irreversible pore adsorption and plugging. Similar results were observed by Bonner et al., Some Aspects of the Fouling of Ultrafiltration Membranes by Natural Organic Matter in Water Treatment. In *Proc.* 1991 *Membrane Technologies in the Water Industry*, Orlando, Fla., pp. 239-251 (1991) when using hydrophilic membranes. The hydrophobicity of the organic substances in the treated water is also important in determining fouling behavior (Cho et al., Membrane Filtration of Natural Organic Matter: Comparison of Flux Decline, NOM Rejection, and Foulants During Filtration with Three UF Membranes. *Desalination,* 127:283-298 (2000a), Schafer et al., Nanofiltration of Natural Organic Matter: Removal, Fouling and the Influence of Multivalent Ions. *Desalination,* 118:109-122 (1998).

Uncharged fractions of NOM were found to significantly foul negatively charged membranes (Cho et al., Ibid; 2000a). Roudman and DiGiano, Surface Energy of Experimental and Commercial Nanofiltration Membranes: Effects of Wetting and Natural Organic Matter Fouling. J. Membrane Sci., 175: 61-73 (2000) found that the surfaces of three experimental thin-film composite nanofiltration membranes became more hydrophilic due to wetting by the permeate water. Unfortunately, the new polymeric materials were not more resistant to fouling than the commercial membranes and in all cases fouling was irreversible. Fan et al, Influence of the Characteristics of Natural Organic Matter on the Fouling of Microfiltration Membranes. *Wat. Res.,* 35:4455-4463 (2001) found that the fouling rate for a hydrophobic membrane was considerably greater than that for a hydrophilic membrane.

Although, pretreatment of raw water (use of chemical clarification or using MF or UF before NF can reduce fouling (e.g., Carroll et al., The Fouling of Microfiltration Membranes by NOM After Coagulation Treatment. *Wat. Res.,* 34:11:2861-2868 (2000); Siddiqui et al., (Ibid; 2000); Lin et al., Ultrafiltration Processes for Removing Humic Substances: Effect of Molecular Weight Fractions and PAC Treatment. *Wat. Res.,* 33:1252-1264 (1999); Chellam et al., Effect of Pretreatment on Surface Water Nanofiltration. *Jour. AWWA.,* 89:10:77-89 (1997b); Amy et al., Membrane Separation of DBP Precursors from Low-Turbidity Surface Waters. In *Proc.* 1993 *Membrane Technology Conf.,* Baltimore, Md., pp. 651-663 (1993); Moulin et al., Potanilisation of Surface Waters by Crossflow Ultra- and Microfiltration on Mineral Membranes: Interest of Ozone. In *Proc.* 1991 *Membrane Technologies in the Water Industry*, Orlando, Fla., pp. 729-737 (1991); Laine et al., Ultrafiltration of Lake Water: Effects of Pretreatment on Organic Partitioning, THM Formation Potential, and Flux. *Jour. AWWA,* 82:12:82-87 (1990)), these methods are costly and have not always met the needs of the industry. As such, it is important that other processes be combined with membrane filtration to enhance its performance.

Ozonation

Ozone is a powerful oxidant and preferentially oxidizes electron-rich moieties which contain carbon-carbon double bonds, and aromatic alcohols (Bablon et al., Fundamental Aspects. In *Ozone in Water Treatment*: Application and Engineering. Ed. By Langlais, B.: Reckhow, D. A.: Brink, D. R. Lewis Publishers, Chelsea, Miss. pp. 11-132 (1991)). Ozonation reactions in aqueous solution involve either direct reactions with molecular ozone or indirect ones with the hydroxyl radical, OH. The decomposition reaction is catalyzed by hydroxide ions and other dissolved compounds such as NOM. OH radicals can react with dissolved organic carbon (DOC) and accelerate the decomposition of ozone (Bablon et al., (Ibid; 1991); Staehelin and Hoigne, Decomposition of Ozone in Water in the Presence of Organic Solutes Acting as Promoters and Inhibitors of Radical Chain Reactions. *Environ. Sci. Technol.,* 19:12:1206-1213 (1985); Hoigne and Bader, Ozonation of Water: Role of Hydroxyl Radicals as Oxidizing Agents. Science, 190:782-784 (1975)). The reaction of organic compounds with hydroxyl radicals will produce organic free radicals that ultimately result in the formation of aldehydes, ketones, alcohols, and carboxylic acids. Some of the aldehydes including formaldehyde, acetaldehyde, glyoxal, and methylglyoxal are of particular concern due to their mutagenicity and carcinogenicity (Richardson, S. D., Drinking Water Disinfection By-products. In: Encyclopedia of Environmental Analysis and Remediation, R. A. Meyers, Ed. New York: John Wiley & Sons, Inc. (1998); Bull and McCabe, Risk Assessment Issues in Evaluating the Health Effects of Alternate Means of Drinking Water Disinfection. In *Water Chlorination: Chemistry, Environmental Impact, and Health effects*, Vol. 5, Edited by Jolley, R. L. et al., Lewis Publishers, Chelsea, Mich. (1984)).

Molecular ozone and OH radical reactions, both of which occur during ozonation, can result in the cleavage of larger molecules. This cleavage results in lower molecular weight material and the formation of more polar and hydrophilic compounds (e.g. see: Koechling et al., Effect of Ozonation and Biotreatment on Molecular Size and Hydrophilic Fractions of Natural Organic Matter. In *Water Disinfection and Natural Organic Matter: Characterization and Control*. ACS Symposium Series 649: 196-210 (1996); Owen et al., NOM Characterization and Treatability. *Jour. AWWA.,* 87:1:46-63 (1995); Amy et al., Molecular Size Distribution of Dissolved Organic Matter. *Jour. AWWA.,* 84:6:67-75 (1992)). A decrease in the concentration of UV absorbing compounds of NOM was also observed during ozonation (Yavich, A. A., The Use of Ozonation and Biological Fluidized Bed Treatment for the Control of NOM in Drinking Water. Ph.D. Dissertation. Michigan State University. (1998); Koechling et al., (Ibid; 1996); Shukairy et al., Bromide's Effect on DBP Formation, Speciation, and Control: Part 1, Ozonation. *Jour. AWWA.,* 86:6:72-87 (1994); Kaastrup and Halmo, Removal of Aquatic Humus by Ozonation and Activated Carbon Adsorption. In *Aquatic Humic Substances: Influence on Fate and Treatment of Pollutants*. I. H. Suffet, and P. MacCarthy, Eds. American Chemical Society, Washington, D.C., pp. 697-726 (1989); Amy et al., Ozonation of Humic Substances: Effects on Molecular Weight Distributions of Organic Carbon and Trihalomethane Formation Potential. *Ozone Sci. Eng.,* 10:39-54 (1988)).

Replacing chlorination with ozonation as the primary disinfectant can significantly reduce the formation of THMs and HAAs (Zhang et al., Characterization and Comparison of Disinfection By-products of Four Major Disinfectants. In *Natural Organic Matter and Disinfection By-Products: Characterization and Control in Drinking Water*, Edited by Barrett, S. E. et al., American Chemical Society, Washington D.C. (2000); Richardson et al, Identification of New Ozone Disinfection By products in Drinking Water. *Environ. Sci. Technol*. 33:19:3368-3377 (1999)). In the presence of NOM, ozonation results in the formation of partial oxidized compounds, which are less reactive with chlorine in forming THMs (Amy et al., (Ibid; 1988). Chang et al. Reducing the Formation of Disinfection By-products by Preozonation. *Chemosphere,* 46:21-30 (2002) found that both pre- and post-ozonation processes can reduce some of DBP precursors and overall DBP-formation potential (DBPFP) more than the conventional drinking water treatment process. They applied the pre-ozonation process to treat drinking water and observed a reduction of 9-54% in DOC and more than 40% of DBPs. The required ozone dosage and the formation of aldehydes and ketoacids increased with increasing NOM concentration (Najm et al., Effects of Bromide and NOM on Byproduct Formation. *Jour. AWWA.*, 87:1:106-115 (1995)). As the ozone dosage increased, THM and HAA formation decreased (Cipparone et al., Ozonation and BDOC Removal: Effect of Water Quality. *Jour. AWWA.*, 89:2:84-97 (1997)). The ozonation of water containing humic substances results in the formation of hydroxyl, carbonyl, and carboxyl groups, and aliphatic and alicyclic ketones (Glaze et al., Evaluation of Ozonation By-products from Two California Surface Waters. *Jour. AWWA.*, 81:8:66-73 (1989); Anderson et al., The Reaction of Ozone with Isolated Aquatic Fluvic Acid. *Org. Geochem.*, 8:1:65-69 (1985)). Gracia et al, Study of the Catalytic Ozonation of Humic Substances in Water and Their Ozonation By products. *Ozone Sci. Eng.*, 18:3:195-208 (1996) obtained similar results. They identified 110 different organic compounds resulting from ozonation of humic substances.

Catalytic Ozonation

The use of catalytic ozonation for the degradation of NOM and other organic compounds in drinking water and wastewater is a promising technology (Legube and Karpel Vel Leitner, N. Catalytic ozonation: A Promising Advanced Oxidation Technology for Water Treatment. Catal. Today, 53:61-72 (1999). For example, Gracia, R.; Cortes, S.; Sarasa, J.; Ormad, P; Ovelleiro, J. L., Catalytic Ozonation with Supported Titanium Dioxide. The Stability of Catalyst in Water. Ozone Sci. Eng., 22: 185-193 (2000); Gracia, R.; Cortes, S.; Sarasa, J.; Ormad, P; Ovelleiro, J. L., Heterogeneous Catalytic Ozonation with Supported Titanium Dioxide in Model and Natural Waters. Ozone Sci. Eng., 22:461-471 (2000); and Gracia, R. et al., (Ibid; 1996) found that the removal of NOM and a model humic acid was significantly greater in the presence of a catalyst than with ozone alone. Legube and Karpel Vel Leitner et al. (Ibid; 1999) reported that attapulgite (a clay-like material) catalyzed the degradation of humic substances by ozone. The mechanism of the catalytic reaction is poorly understood, but it is thought that, at least in some cases, the metal oxide surface initiates the decomposition of ozone and that produces .OH or .$O_2^-$ radicals which degrade sorbed organic compounds (Legube and Karpel Vel Leitner, (Ibid; 1999). Li, W.; Gibbs, G. V.; Oyama, S. T. Mechanism of Ozone Decomposition on a Manganese Oxide Catalyst. 1. In Situ Raman Spectroscopy and ab initio Molecular Orbital Calculations. J. Am. Chem. Soc., 120:9041-9046 (1998) found that the decomposition of ozone on manganese resulted in the formation of a peroxide specie. It is not known if this peroxide is responsible for the degradation of sorbed organic compounds. Other possible mechanisms are discussed by Legube and Karpel Vel Leitner (Ibid; 1999).

As is discussed below, catalytic ozonation may reduce membrane fouling problems by degrading organic foulants sorbed on or trapped near the membrane surface. Several metal oxides that are used in the fabrication of ceramic membranes catalyze ozone decomposition. Titania catalyzes ozone decomposition and it also catalyzes the removal of NOM and other organic compounds in the presence of ozone (e.g., Gracia et al., (Ibid; 2000a and 2000b). Alumina and zirconia have been shown to promote the decomposition of ozone (Radhakrishnan, R. and Oyama, S. T.; Chen, J. G. G.; Asakura, K. Electron transfer Effects in Ozone Decomposition on Supported Manganese Oxide. J. Phys. Chem. B, 105: 4245-4253 (2001); Legube and Karpel Vel Leitner (Ibid; 1999). γ-alumina is reported to catalyze the degradation of 2-chlorophenol by ozone (Ni, C. H.; and Chen, J. N. Heterogeneous Catalytic Ozonation of 2-chlorophenol Aqueous Solution with Alumina as a Catalyst. Water Sci. Technol., 43:213-220 (2001). An iron coated alumina catalyzed the degradation of phenol by ozone (Al Hayek, N.; Legube, B.; Dore, M. Ozonation Catalytique (FeIII/$Al_2O_3$) du phenol et de ses produits d'ozontion. Environ. Technol. Lett., 10:415-426 (1989). To our knowledge, there are no reports in the literature of zirconia catalyzing the reaction of ozone with NOM or similar organic compounds.

Manganese dioxide and iron oxide, which are not commonly used for the fabrication of ceramic membranes, are known to catalyze the degradation of various organic compounds in the presence of ozone (e.g., Lim, H. N.,; Choi, H.; Hwang, T. M.; Kang, J. W. Characterization of Ozone Decomposition in a Soil Slurry. Water Res., 36:219-229 (2002); Andreozzi, R.; Caprio, V. Marotta, R. Tufano, V. Kinetic Modeling of Pyruvic Cid Ozonation in Aqueous Solution Catalyzed by Mn(II) and Mn(IV) ions. Water Res., 35:109-120 (2001); Choi, H.; Kim, Y. Y.; Cho, J.; Kang, J. W.; Kim, K. S. Oxidation of Polycyclic Aromatic hydrocarbons by Ozone in the Presence of Sand. Water Sci. Technol.; 43:349-356 (2001); Radhakrishmnan, R.; Oyama, S. T., Ozone Decomposition over Manganese Oxide Supported on $ZrO_2$ and $TiO_2$: A Kinetic Study using in situ Laser Raman Spectroscopy. J. Catal., 199:282-290 (2001); Ma, J. and Graham, N. J. D., Degradation of Atrazine by Manganese-catalysed ozonation: Influence of Humic Substances. Water Res., 33:785-793 (1999); Li, W.; Gibbs, G. V.; Oyama, S. T. (Ibid; 1998); Li, W.; Oyama, S. T. Mechanism of Ozone Decomposition on a Manganese Oxide Catalyst. 2. Steady-state and Transient Kinetic Studies. J. Am. Chem. Soc., 120:9047-9052 (1998), Masten, S. J. and Davies, S. H. R., Efficacy of In-situ Ozonation for the Remediation of PAH Contaminated Soils. J. Contam. Hydrol. 28:327-335 (1997) and Andreozzi, R.; Caprio, V., D'Amore, M. G.; Insola, V. Manganese Catalysis in Water Pollutants Abatement by Ozone. Environ. Technol., 16:885-891 (1995). Manganese dioxide is a particularly effective catalyst and it is used in at least one commercial catalytic ozonation system (manufactured by NGK Insulators Inc., Tokyo, Japan).

Ozonation/Membrane Filtration

Few researchers have investigated the combination of ozonation and membrane processes. Unfortunately, organic membranes are prone to destruction by ozone (Shanbag, P. V., Guha, A. K., Sirkar, K. K. Membrane-Based Ozonation of Organic Compounds. Ind. Eng. Chem. Res., 34:11:4388-4398 (1998); Castro, K., Zander, A. K., Membrane Air-stripping: Effects of Pretreatment. Jour. AWWA., 87:3:50-61 (1995); and Shen, Z., Semmens, J. J. A novel Approach to Ozone—Water Mass Transfer Using Hollow—Fiber Reactors. Environ. Tech., 11:597-608 (1990). In order to prevent damage to the membrane, a retention or aeration tank is often used between ozonation and the membrane module, allowing for stripping of residual ozone. Hyung, H.; Lee, S., Yoon, J.; Lee, C.-H. Effect of Preozonation on flux and Water Quality in Ozonation-Ultrafiltration Hybrid System for Water Treatment. Ozone Sci. Eng., 22:637-652 (2000) investigated the effect of ozonation on membrane flux and water quality in an ozonation/UF hybrid system using water from two unidentified locations in the Han River. Ozonated water was retained for one hour before being used as feed water to the UF. They found that membrane flux varied inconsistently with the quality of water. About 22% of TOC, 64% of UV-254, and 36-53% of THM precursors were removed by this hybrid system. (O'Connell, J.; Danos, S. An Innovative Combination of Ozonation and Ultrafiltration. In Proc. 1997 Membrane Technologies Conf., New Orleans, La., pp. 1127-1145 (1997) used a similar system to treat well water with elevated levels of iron and manganese. High removal rates, 97% of the iron and 91% of the manganese, were achieved and the quality of permeate remained consistent, despite the fluctuation of feed quality.

Ozone-resistant membranes may be used to avoid the problem of membrane oxidation. (Hashino, M.; Mori, Y.; Fujii, Y.; Motoyama, N.; Kadokawa, N.; Hoshikawa, H.; Nishijima, W.; Okada, J. Pilot Plant Evaluation of an Ozone-Microfiltration System for Drinking Water Treatment. Water Sci. and Tech., 41:10-11:17-23 (2000) reported, when using an ozone resistant polyvinylidenefluoride (PVDF) MF membrane, that high dissolved ozone concentrations on the membrane surface were necessary to obtain high permeate fluxes and to prevent membrane fouling. Ceramic membranes in combination with ozonation achieved a high permeate flux without membrane damage (Kim, J. O.; Somiya, I. Effective Combination of Microfiltration and Intermittent Ozonation for High Permeation Flux and VFAs Recovery from Coagulated Raw Sludge. Environ. Technol., 22:7-15 (2001); Kim, J.-O., Somiya, I.; Fujii, S. Fouling Control of Cermaic Membrane in Organic Acid Fermenter by Intermittent Ozonation. In Proceedings of the 14$^{th}$ Ozone World Congress. Vol. 1, pp. 131-143, Dearborn, Mich. (1999); Moulin, C. et al., (Ibid; 1991). Kim et al (Ibid; 1999) showed that intermittent ozonation is effective for maintaining high permeation flux and prevents membrane fouling caused by particle accumulation on the membrane surface. These studies demonstrate the potential of ozone to reduce membrane fouling. The potential exists to decrease membrane fouling further or reduce ozone dosages by the use of a catalytic membrane to selectively oxidize the organic material deposited at the membrane surface.

Catalytic Membranes

The use of catalytic membranes for synthesis and for the treatment of waste streams is an emerging technology (Coronas, J.; Santamaria, J. Catalytic Reactors based on Porous Ceramic Membranes. Catal. Today, 51:377-389 (1999). Catalytic membranes may be useful for the degradation of membrane foulants, as the possibility of surface chemical reactions occurring with the sorbed or trapped species is greater than for substances that are in the bulk water phase. Liu, P., Wang, X. C., Fu, X. Z., Processing and Properties of Photocatalytic Self-cleaning Ceramic. J. Inorg. Materials, 15:88-92 (2002) described the use of a "self-cleaning" membrane for the filtration of oleic acid solutions. The membrane was prepared by coating a photocatalytic membrane on a ceramic matrix. Tsuru, T., Toyosada, T., Yoshioka, T., Asaeda, J., Photocatalytic Reactions in a Filtration System through Porous Titanium Dioxide Membranes. J. Chem. Eng. Japan, 34:844-847 (2001) also found that membrane fouling could be reduced by the photocatalytic degradation of organic foulants. In a model system containing 500 ppm polyethyleneimine the volume flux increased two-fold when the membrane was illuminated and then decreased to nearly its original level when the light was turned off. These studies show the potential that radical species generated at or near the membrane surface could significantly reduce fouling problems in membrane filtration systems. The advantages of the ozone system proposed over a photocatalytic membrane are that the geometry of the membrane module is not constrained by the need to irradiate the membrane surface and in the ozone system the degradation of NOM can also occur in the bulk water.

Membrane Properties and Membrane Performance

The electrokinetic properties of NF membranes have a great influence on permeate flux, solute rejection and the fouling properties of the membrane. The flux through a membrane is influenced by surface charge due to the "electro-viscous effect". The electro-viscous effect arises due to an apparent increase in the viscosity of the electrolyte solution due to liquid flow induced by the conduction current, in the opposite direction to the pressure flow (Erickson, D., Li, D., Streaming Potential and Streaming Current Methods for Characterizing Heterogeneous Solid Surfaces. J. Colloid Interfac. Sci., 237:283-289 (2001). The flux through NF membranes is greatest when the charge on the membrane surface is near zero (e.g., Tsuru, T., Hironaka, D., Yoshioka, T., Asaeda, M., Titania Membranes for Liquid Phase Separation: Effect of Surface Charge on Flux. Sep. Purif. Technol. 25:307-314 (2001); Childress, A. E., Elimelech, M., Relating Nanofiltration Membrane Performance to membrane Charge (Electrokinetic). Characteristics. Environ. Sci. Technol., 34:3710-3716 (2000); and Huisman, I. H., Tragardh, G., Tragardh, C., Pihlajamaki, A., Determining the Zeta-potential of Ceramic Microfiltration Membranes using the Electro-viscous Effect. J. Membr. Sci., 147:187-194 (1998). The rejection of charged species by the membrane is also strongly affected by surface charge (Childress and Elimelech, (Ibid; 2000); and Cho, J., Amy, G., Pellegrino, J., Membrane Filtration of Natural Organic Matter: Factors and Mechanisms Affecting Rejection and Flux Decline with Charged Ultrafiltration (UF), membrane. J. Membr. Sci., 164:89-110 (2000). The fouling of the membrane is influenced by electrostatic repulsion effects between the NOM and the membrane surface (Seidel, A., Elimelech, M., Coupling between Chemical and Physical Interactions in Natural Organic Matter (NOM) fouling of Nanofiltration Membranes: Implications for Fouling Control. J. Membr. Sci., 203:245-255 (2002); Cho et al., (Ibid; 2000)). Other surface properties may influence membrane performance. As mentioned previously, hydrophobic membranes are generally more prone to fouling by natural organic material than are hydrophilic membranes.

Membrane surface charge is influenced not only by the properties of the membrane material but also by the solution chemistry of the water being filtered. Sorption of charge species particularly, divalent cations, such as $Ca^{2+}$, have a pronounced influence on membrane surface charge and performance (e.g., Tay, J.-H., Liu, J., Sun, D. D., Effect of Solution Physico-chemistry on the Charge Property of Nanofiltration Membranes. Water Res., 36:585-598 (2002); Cho et al., (Ibid; 2000); and Childress, A. E., Elimelech, M., Effect of Solution Chemistry on the Surface Charge of Polymeric Reverse Osmosis and Nanofiltration Membranes. J. Membr. Sci., 119:253-268 (1996)).

In a catalytic membrane, the catalyst will alter the surface charge of the membrane. A catalytic filtration layer may also alter both the surface charge and the permeability of the membrane. A thin coating of the catalyst would alter the surface charge of the membrane, if the acid-base properties of the catalyst and underlying membrane material were different. However, due to the limited thickness of the catalytic coating, it probably would not have a pronounced effect on the permeate flux or streaming potential of the membrane (Szymczyk, A., Fievet, P., Reggiani, J. C., Pagetti, J., Determination of the Filtering Layer Electrokinetic Properties of a Multi-layer Ceramic Membrane. *Desalination*, 116:81-88 (1998).

OBJECTS

It is therefore an object of the present invention to provide a process, which reduces fouling of ceramic membranes. It is further an object of the present invention to provide purer water. These and other objects will become increasingly apparent by reference to the following description.

SUMMARY OF THE INVENTION

The present invention relates to a composite material for purification and filtration of water containing ozone and organic matter which comprises: (a) a microporous to mesoporous inert ceramic filter; and a multi-layered, nanocrystalline, sintered ceramic metal oxide catalyst membrane coating on surfaces of the ceramic filter, wherein the catalyst in use degrades the ozone in the water into a hydroxyl or other radical in situ which reacts with the organic matter in the water resulting in the removal of the organic matter by the composite ceramic membrane during filtration. Preferably the metal oxide is selected from the group consisting of titanium oxide, manganese oxide and ferric oxide. Preferably the ceramic filter has been coated with a metal oxide or hydroxide, which has been dried to a metal oxide to provide the catalyst on the membrane. Preferably the membrane has a molecular weight cutoff for organic matter of 500 Da or more. Preferably the ceramic filter has a pore size of between about 0.001 and 50 micrometers.

The present invention also relates to a method for forming a composite for purification and filtration of water containing ozone and organic matter which comprises: (a) providing a microporous to mesoporous inert ceramic filter; (b) coating the ceramic filter with a multi-layered, nanocrystalline, sintered, ceramic metal oxide catalyst by depositing on the filter surface a suspension of a metal oxide or hydroxide or ceramic to form the catalyst; and (c) heating the precursor coated filter to adhere the metal oxide or ceramic to the filter surface as the catalyst. Preferably the metal oxide is selected from the group consisting of titanium oxide, manganese oxide and ferric oxide produced by heating a titanium oxide, manganese hydroxide or ferric oxide as the precursor coating on the surface of the ceramic filter. Preferably the membrane is produced by a molecular weight cutoff for the organic matter of 500 Da or more. Preferably the ceramic filter has a pore size between about 0.001 and 50 micrometers.

The present invention also relates to a method for purification and filtration of water containing ozone and organic matter which comprises: (a) providing a composite material in a reactor which comprises a microporous to mesoporous inert ceramic filter, and a multi-layered, nanocrystalline, sintered, ceramic metal oxide catalyst membrane coating on surfaces of the ceramic filter, wherein the catalyst in use reduces the ozone in the water into a hydroxyl or other radical in situ which react with the organic matter in the water resulting in removal of the organic matter by the composite; (b) filtering the water containing the ozone and organic matter through the ceramic membrane to decompose the ozone to the hydroxyl or other radical which reacts with the organic matter, which is retained on the membrane and the purified and filtered water is produced as a filtrate; and (c) removing the purified and filtered water as the filtrate from the reactor. Preferably the metal oxide is selected from the group consisting of titanium oxide, manganese oxide and ferric oxide. Preferably the ceramic filter is coated with a metal oxide or hydroxide as a precursor which is dried to the metal oxide as the catalyst on the membrane. Preferably the membrane has a molecular weight cutoff of 500 Da for the organic matter or more. Preferably the ceramic filter has a pore size of between about 0.001 and 50 micrometers.

The present invention also relates to a microporous composition for purification and filtration of water containing ozone and organic water which comprises a ceramic material comprising a metal oxide/ceramic catalyst for degrading the ozone in the water.

The present invention also relates to a method for purification and filtration of water containing organic matter which comprises: (a) providing in a reactor a microporous composition which comprises a ceramic material comprising a multi-layered, nanocrystalline, sintered, ceramic, metal oxide catalyst for degrading the ozone in the water; and (b) filtering the water containing the ozone and organic matter through the microporous composition in the reactor to decompose the ozone into hydroxyl or other radicals in situ which react with the organic water, resulting in the removal of the organic matter by the composition; and (c) removing the purified and filtered water as the filtrate from the reactor.

DESCRIPTION OF PREFERRED EMBODIMENTS

Figure 1:
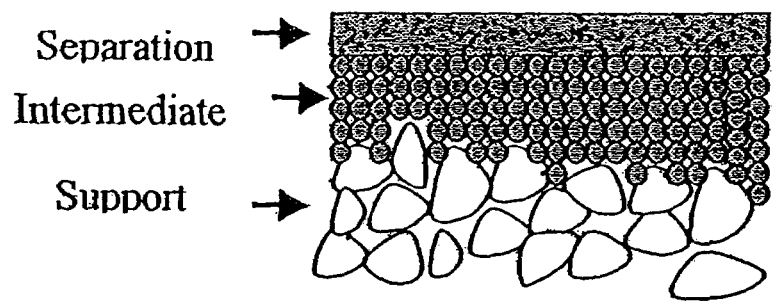
FIG. 1 shows a structure of an asymmetric composite membrane (after Tsuru, 2001).

The present invention provides a combined ozonation and membrane filtration system to control disinfection by-product (DBPs) precursors in drinking water. Ceramic membranes coated with a nano-crystalline catalyst that decomposes ozone are used in this invention. The invention provides:

(1) methods for the preparation of nano-crystalline ceramic membranes, which catalyze the decomposition of ozone and foulants and to characterize these membranes.

(2) A comparison of the effect of ozonation on membrane fouling in filtration systems using both conventional and catalytic membranes.

(3) For the source waters studied, a determination of the effect of ozonation on the properties of natural organic matter (e.g., humic substances, non-humic substances, biodegradable dissolved organic carbon) and relate this information to the overall performance of the system.

(4) A determination of the effect of control parameters (e.g., trans-membrane pressure, ozone dosage, cross-flow rate) on the fouling rate and product water quality using selected conventional and catalytic membranes.

The following ozonation and ceramic membrane process results were found:

Conventional sol-gel and sintering techniques can be used to produce membranes having the desired molecular weight cut-off (MWCO), permeability and catalytic properties.

The use of metal oxides that catalyze ozone decomposition results in the formation of OH and other radicals at the membrane surface, thereby decomposing natural organic matter and reducing membrane fouling.

Molecular ozone and OH radical reactions in the bulk water phase and on the surface yield a reduction in the levels of total organic carbon (TOC), UV-2564, and the conversion of humic substances (HS) to non-humic substances (NHS).

The ozonation and membrane process produces biologically stable water, which contains low biodegradable organic carbon. This also results in the decrease of DBP concentrations after chlorination.

The reaction of OH radicals generated at the surface with natural organic matter (NOM) sorbed to the ceramic surface results in better operation (e.g., less fouling, lower pressure drop) along with the enhanced decomposition of the ozone- and radical-reactive species in drinking water. The mode of operation results in a more stable permeate flux and extends the operational period between backwashing or cleaning.

This invention demonstrates the feasibility of a combined ozonation and membrane technology for controlling DBP precursors in drinking water treatment. Ceramic membranes and ceramic membranes coated with nanocrystalline materials were used in this invention.

The combination of ozonation with catalytic ceramic membrane filtration has significant advantages over conventional application of ozone and membrane filtration. As discussed above, fouling of membrane filters is a major problem. The generation of free radicals at the membrane surface where the NOM has been deposited appears to result in a significant decrease in deposit formation and therefore in fouling. The use of a catalyst avoids the elevated ozone dosages deemed necessary by Hashino, M. et al., (Ibid; 2000), thus reducing overall treatment costs and the potential for the formation of ozone DBPs, such as bromate. Unlike with photocatalytic membrane systems, using ozone allows for the reaction of NOM in the bulk phase, thereby reducing the concentration of regulated DBPS formed during subsequent chlorination. Both ozone and membrane filtration achieve pathogen control. Since the two processes operate by different mechanisms: ozone results in the chemical destruction of the cell, membrane filtration affords the physical exclusion of the pathogens; the combination provides redundancy for further protection of drinking waters. Since the reject stream and backwash water is also treated with ozone, the reduction in pathogen numbers in this waste stream better allows utilities to comply with Filter Backwash Recycling Rule (under the SDWA), if this is deemed necessary by the US EPA and/or State Regulatory Agencies. Membrane filtration has been shown to effectively protect water supplies from protozoan pathogens such as *Cryptosporidium* sp. (US EPA, Ibid; 2001a). As such, CT credit can and has been given by numerous states, thereby reducing subsequent required chlorine dosages and minimizing DBP formation.

The initial goal of this invention was the development of a nano-crystalline ceramic membrane that catalyzes the decomposition of ozone and has the desired porosity, permeability and MWCO. Once membranes were formed, the membranes(s) were evaluated in combination with ozone for its ability to resist fouling, alter the NOM and control DBPs. The optimized membrane was investigated to determine the effect of control parameters on the fouling rate and product water quality.

Preparation of Catalytic Membranes

Many methods have been used for the preparation of catalytic membranes (Tsuru, T., et al. (Ibid; 2001). The sol-gel method is widely used for the preparation of UF and NF ceramic membranes (e.g., Tsuru, T., et al., (Ibid; 2001a); Guizard et al; Design of Nanosized Structures in Sol-gel Derived Porous Solids. Applications in Catalyst and Inorganic Membrane Preparation. *J. Materials Chem.,* 9: 55-65 (1999). FIG. 1 illustrates the typical structure of the ceramic membrane; the membrane is an asymmetric-composite.

A porous support having a thickness of the order of a millimeter was used to provide strength. The pore size in the support is in excess of 1 μm. α-Al$_2$O$_3$ is commonly used for the support. An intermediate layer was coated onto the support to reduce the pore size and roughness and to allow a thin top layer, having a thickness on the order of 1-3 μm, to be used. The top layer is the separation layer and its pore size is chosen for the specific application. Using the sol-gel process, pore sizes in the separation layer can be controlled from less than 1 nm to 50 nm, largely by controlling the particle size and sintering conditions (Tsuru, (ibid; 2001); Tsuru et al., (ibid; 2001a).

Two methods can be used for the preparation of the catalytic membranes. The first method prepared the membrane using a separation layer formed using the catalytic material. Using the catalyst to form the membrane can offer better performance, however, preparation of membranes with the desired properties and integrity can be a time consuming process. This may be particularly true in the case of manganese and iron oxide catalysts, as there is not extensive literature on the preparation of membranes with these materials. The second method to create a catalytic membrane is to coat an existing membrane with a thin layer of catalyst. This coating may not be thick enough to form a separation layer. However, if the surface coverage is sufficient, the membrane coating has useful catalytic properties.

Using a composite membrane may complicate the interpretation of the results, as all the materials commonly used to prepare ceramic membranes catalyze the degradation of ozone to some extent, so the support and intermediate layers may also serve as catalysts. Because of the high resistance of the separation layer, it is difficult to prepare unsupported UF or NF membranes with reasonable permeabilities. For this reason use of a composite membrane is the most reasonable approach, despite the complications mentioned above.

Three materials were identified that have suitable catalytic properties: titania, manganese oxide and ferric oxide. Sol-gel methods for the preparation of titania (e.g., Tsuru et al., (ibid; 2001a); Puhlfurss et al., Microporous $TiO_2$ Membranes with a Cut Off<500 Da. *J. Membr. Sci.*, 174:123-133 (2000); Chou et al., Coating and Characterization of Titania membrane on Porous Ceramic Supports. *J. Porous Materials*, 6:217-225 (1999) and ferric oxide (McKenzie et al., Nanoporous Iron Oxide Membranes: layer-by Layer Deposition and Electrochemical Characterization of Processes within Nanopores. *New J. Chem.*, 26:625-629 (2002); Hackley et al., Synthesis and Characterization of Unsupported Ferric-Oxide Ceramic Membranes. *J. Membr. Sci.* 70:41-51 (1992) membranes based are described in the literature. The methods used to prepare the catalytic membranes were based on these methods. To our knowledge no methods for the preparation of a manganese oxide membrane are described in the literature. Initial investigations are based on methods to prepare nanoparticulate manganese dioxide films (Radhakrshnan et al., (Ibid; 2001); Pang et al., Novel Electrode Materials Thin-Film Ultracapacitors: Comparison of Electrochemical Properties of Solgel Derived and Electrodeposited Manganese Dioxide. *J. Electrochem. Soc.*, 147:244-250 (2000)).

NF membranes with a target MWCO of 1000 Da were prepared. While a considerable degree of control of membrane pore size can be achieved, the development for the preparation of ceramic membranes with specific MWCOs can be a time consuming process. Published methods or commercial membranes were used wherever possible. The membrane supports were purchased from a commercial membrane supplier (TAMI Industries, Nyons, France).

As permeability is an important parameter in determining membrane performance, permeability testing was used to screen the membranes for more comprehensive evaluation. Initial screening was based on the determination of the initial permeate flux using pure water. Membranes were judged acceptable if the permeate flux is comparable to or greater than that of similar membranes described in the literature. Further screening was based on the MWCO of the membrane.

Ozone/Membrane Filtration System

Figure 2:
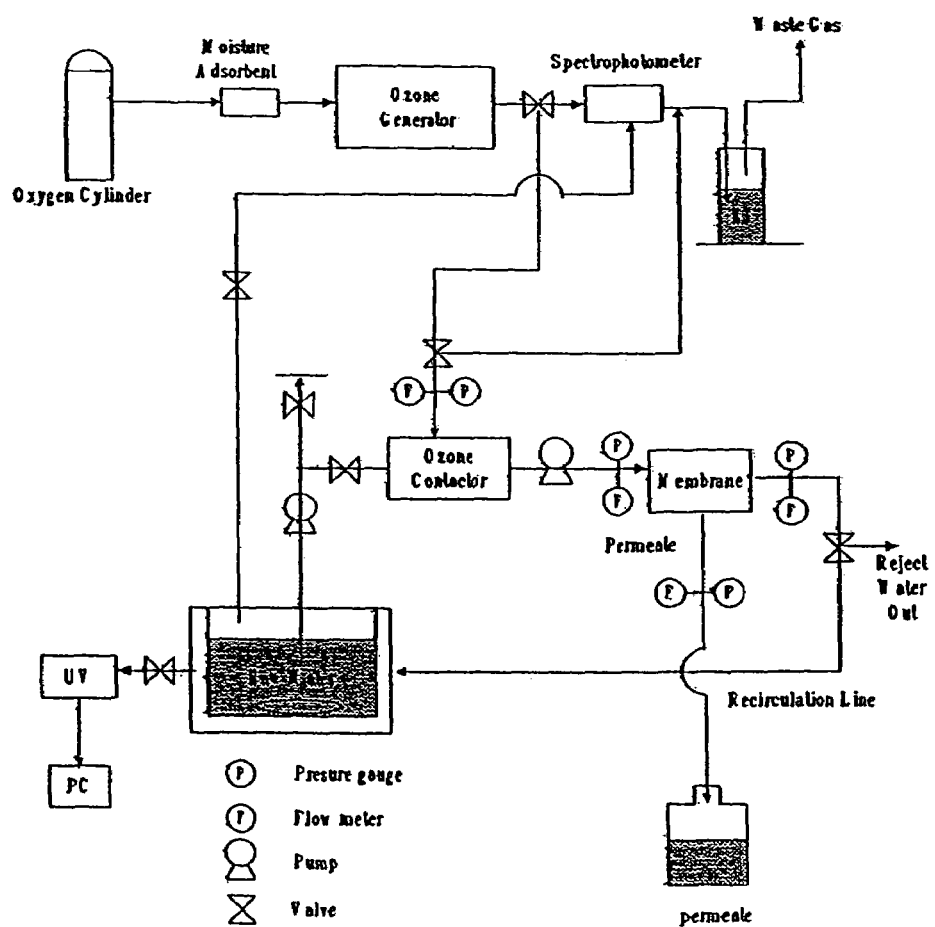
FIG. 2 shows a schematic of the setup for the continuous ozonation/membrane system.

A bench scale system was used to investigate the ozone/membrane filtration process. A schematic diagram of this system is shown in FIG. 2. Ozone was introduced into the system using an in-line injector. The water was pumped from the reservoir through a cross-flow membrane filter apparatus. Teflon or stainless steel tubing, joints and valves were used throughout the system. A water-jacketed glass reservoir, was used to control water temperature. The temperature of the water was monitored by a thermometer. A magnetic stirrer at the bottom of the reservoir was used to mix the water. The water flow rate through the membrane was adjusted by regulating the rate at which water was pumped into the membrane module.

Prior to ozonation, raw water samples were pre-filtered through a microfilter to remove any suspended solids. Before running the prefiltered raw water samples, DI water was used to rinse the membrane module to remove any contaminants that may consume the dissolved ozone. Thereafter, prefiltered water replaced DI water. The permeate from the membrane module was collected in a bottle with cap. The reject water was either recycled or wasted.

Several membranes constructed were tested to ascertain their fouling properties. Based on these results, selected membranes were further studied to determine their ability to produce high quality water.

Membrane Fouling and Catalytic Properties

Following preliminary screening to identify those membranes that had both adequate permeate fluxes and an appropriate MWCO, further investigations were conducted to determine the catalytic properties of the selected membranes and their resistance to fouling. These experiments were conducted using the apparatus described in FIG. 2. The experiments were conducted using natural waters. For comparative purposes, "control" experiments were conducted using commercial membranes and the same source water (taken at the same time and location).

The removal of disinfection by-products and their precursors were investigated using a combined ozonation-nanofiltration system. The results compare performance of the system using a commercial membrane and the same membrane coated with 20 or 40 layers of iron oxide nanoparticles (4-6 nm in diameter). For the coated membranes, the finished water showed significant improvement in the water quality as compared to that obtained with the uncoated membranes. Hydroxyl radicals produced at the iron oxide coated membrane surface as a result of ozone decomposition are believed to enhance the degradation of the NOM and reduce the concentration of DBPs and their precursors, thus resulting in a decrease in the concentration of DBPs formed. Increasing the number of layers of the catalyst (from 20 to 40) did not result in a significant improvement in performance. Increasing the sintering temperature resulted in some improvement in the removal of the ozonation by-products. A 5 kD MWCO membrane, coated with 20 layers of iron oxide and sintered at 900° C., combined with ozonation (gaseous ozone concentration of 2.5 g/m$^3$) produced permeate water that met the EPA regulatory requirements for TTHMs and HAAs set under Stage 2 D/DBPs Rule.

EXPERIMENTAL

Membrane Preparation and Characterization

Tubular AZT (alumina, zirconia, titania) ceramic membranes (Clover-leaf design (containing three channels), CeRAM Inside, TAMI North America, St. Laurent, Québec, Canada) with molecular weight cut-offs of 15 kD and 1 kD were used as a support for the catalytic coatings. The external diameter of each membrane was 10 mm and the active membrane length was 8 cm. The total filtering area of the membrane was approximately 11 cm2 and the membranes can be operated in the pH range from 0-14.

The colloidal particles used for coating the membranes were prepared by Sorum's method (Mulvaney, P., et al., *Langmuir* 4, 1206 (1998). The procedure used was as follows: deionized water (DI) water (450 mL) was heated until it boiled vigorously; then 50 mL of freshly prepared 20 mM $FeCl_3$ solution was added at a rate of approximately two drops per second. The sol rapidly turned golden brown and finally deep red. After all the ferric chloride solution was added, the suspension was allowed to boil for an additional 5 minutes; it was then cooled to room temperature and dialyzed for 48 hours against a dilute nitric acid solution with a pH of 3.5.

TEM characterization was performed using a JEOL 100CX at an accelerating potential of 100 kV and magnifications ranging from 5000× to 370000×. The TEM protocol for the particle characterization involved diluting the suspension with DI water in the ratio of 1:4. Double sided sticky tape was attached to a glass slide (76.2 mm×25.4 mm×1 mm), leaving a small section (approximately 2-3 mm) of the tape hanging off the long side of the slide. Masking tape was then used to cover the portion of the double-sided tape which rested on the glass slide, leaving the excess double-sided sticky tape uncovered. Grids (0.25% Formvar and carbon) were placed on the overhanging double-sided sticky tapes with light tweezer pressure to just ensure that the grids would stick. The suspension was then placed dropwise on to the grids and the excess removed with filter paper. The grids were then air-dried in a dust free environment until examination in the TEM. Micrographs were collected with a Megaview III digital camera. From the micrographs, the particles were determined to have a diameter of 4 to 6 nm.

The layer-by-layer technique used to coat the membranes is based on a protocol described by McKenzie et al, (ibid; 2002) for coating doped tin oxide electrodes. The membrane was immersed into the colloidal suspension for one minute and then rinsed with DDI water. Then, the membrane was immersed in an aqueous phytic acid (40 mM) for one minute and rinsed with the DDI water. This sequence was repeated to give the desired number of layers (20 or 40) of iron oxide nanoparticles. After coating, the membrane was either baked at 500° C. for 60 minutes or sintered at 900° C. for 30 minutes. The permeability of the membranes was tested using DI water (Karnik, B. S., et al., Water Research, Vol. 39, p. 728-734, 2005).

Ozonation/Membrane Filtration

The schematic representation of the ozonation/membrane system is shown in FIG. 2 as previously described. A stainless steel filter holder, TEFLON® tubing and stainless steel or TEFLON® joints and valves were used throughout the system. Other components included: 3.5-liter and 1.5-liter water-jacked glass reservoirs made of Pyrex glass, and a simple Y inline mixer (Ozone Service, Burton, B. C., Canada). The membranes were used for membrane filtration. A TEFLON® valve was placed after the membrane to create transmembrane pressures of 0.2 to 0.5 bars.

To generate ozone, pure oxygen gas (99.999%) from a pressurized cylinder was dried using a molecular sieve trap, and then fed to the ozone generator (Model OZ2PCS, Ozotech, Inc., Yreka, Calif.). The voltage applied to the ozone generator was varied to control the gaseous ozone concentration. The excess gas was vented to the atmosphere after the gas was passed through a 2% potassium iodide (KI) solution to destroy any residual ozone gas. The water level in the 3.5-liter reservoir was maintained at a constant level during the experiments using a peristaltic pump (Masterflex Model 7520-35, Cole-Parmer Co., Chicago, Ill.) to transfer water from a 1.5-liter reservoir into the 3.5 liter reservoir. A constant water temperature of 20° C. was maintained using a recirculation water bath.

Water Source

Experiments were carried out using samples taken from Lake Lansing (Haslett, Mich.), which is a borderline eutrophic lake. The typical characteristics of the water from Lake Lansing, are given in Table 2. The samples were collected at the boat ramp at the Lake Lansing Park-South, Haslett, Mich. in five-gallon polyethylene carboys and stored at 4° C. The maximum storage period was seven days. Water samples were pre-filtered through a 0.45-μm mixed cellulose ester filter (Millipore-HA) before testing.

TABLE 2

Typical Characteristics of Lake Lansing Water (Haslett, MI)[a]

| Parameters | Lake Lansing |
| --- | --- |
| TOC (mg/L | 8.6 to 11.6 |
| pH | 7.7 to 8.6 |
| Alkalinity (mg/L as $CaCO_3$) | 145 to 157 |
| UV-254 (abs.) | 0.160 to 0.180 |
| SDS THM$_b$ (μg/L) | 240 |
| SDS HAA[b] (μg/L) | 75 |
| BDOC (mg/L) | 1.0 to 4.1 |
| Nitrate (mg/L) | 0.44 |
| Total Phosphate (mg/L) | 0.06 |
| Hardness (mg/L as $CaCO_3$) | 190 to 198 |

[a]All data reported is obtained from the Lake Lansing Watershed Advisory Committee Report (1998) (Lake Lansing Watershed Advisory committee. Progress Report, Ingham County Drain Commissioner's Office, Mason, MI (1998)) except for SDS THM and SDS HAA, which were measured as part of this study.
[b]SDS THM and SDS HAA were measured using Standard Method 5710 and USEPA Method 552.2 respectively.

Analytical Methods

Gas-Phase Ozone Analysis

The absorbance of ozone in the gas phase was measured at 254 nm with a Milton Roy Genesis-5 spectrophotometer (Milton Roy, Inc., Rochester, N.Y.) using a 2-mm path length quartz flow-through cell. An extinction coefficient of 3000 $M^{-1}$ $cm^{-1}$ (J. Hoigne, The Chemistry of Ozone in Water: *Process Technologies for Water Treatment*, Plenum Publishing Corp. New York (1988) was used to calculate the ozone concentration.

UV-254 Absorbance

The UV absorbance of the water samples was measured at a wavelength of 254 nm with a Milton Roy Genesis-5 spectrophotometer (Milton Roy, Inc., Rochester, N.Y.) using a 1 cm quartz cell.

Dissolved Organic Carbon (DOC)

DOC was analyzed using an OI Analytical Model 1010 analyzer. The TOC analyzer uses the UV/persulfate method (*Standard Methods for the Examination of Water and Wastewater.* $20^{th}$ ed., Greenberg, A. E., Clesceri, L. S., and Easton, A. D., Eds., APHA, AWWA, WEF. (1998)). To ensure the reliability of the method, standards having TOC concentrations of 2.5, 5, 7, 10 mg/l (OI Analytical) were run and samples were analyzed in triplicate. A blank was also run with every set of samples.

Humic Substances and Non-Humic Substances

The concentrations of humic substances in the samples were measured by adsorption on an XAD-8 resin according to Method 5510C (*Standard Methods for the Examination of Water and Wastewater*, (ibid; 1998). A 100 mL sample was acidified with concentrated phosphoric acid to a pH of 2, the acidified sample was then eluted through a 10 mm diameter (ID)×15 cm long column at a flow rate of 2 mL/min. The effluent from the column was collected and then analyzed for TOC, which represents the non-humic fraction of the dissolved organic matter in the water sample. The resin-packed column was then back eluted with 100 mL of 0.1 N sodium hydroxide at a flow rate of 2 mL/min. The eluent was collected and acidified with concentrated phosphoric acid to a pH less than 4, purged with high-purity helium for 3 minutes to remove the inorganic carbon, and analyzed for TOC. The organic content of the eluent represents the concentration of humic substances.

Trihalomethanes (THMs) and Halo Acetic Acids (HAAs).

Water samples were dosed with a chlorine concentration that ensured a residual chlorine concentration in the range of 0.5 to 2 mg/L after 48 hours incubation at room temperature, according to the procedures in Method 2350 (*Standard Methods for the Examination of Water and Wastewater*, (ibid; 1998)). The THM compounds, chloroform $CHCl_3$), bromodichloromethane ($CHBrCl_2$), dibromochloromethane ($CHBr_2Cl$), and bromoform ($CHBr_3$), were extracted from the water samples using hexane and analyzed by gas chromatography (Method 5710, *Standard Methods for the Examination of Water and Wastewater*, (Ibid; 1998). A Perkin Elmer Autosystem gas chromatograph (Perkin Elmer Instruments, Shelton, Conn.) equipped with an electron capture detector (ECD), an auto sample, and a 30 m×0.25 mm I.D., 1 μm DB-5ms column (J&W Scientific, Folsom, Calif.) was used for the analysis. The oven temperature was ramped from 50° C. to 150° C. at a rate of 10° C./min. The flow rate of the carrier gas ($N_2$) was 12.0 mL/min. The injector temperature and detector temperature were 275 and 350° C., respectively.

SDS HAAs were produced by chlorination as described above. The concentrations of monochloroacetic acid (MCAA), monobromoacetic acid (MBAA), dichloroacetic acid (DCAA), bromochloroacetic acid (BCAA), trichloroacetic acid (TCAA), and dibromoacetic acid (DBAA) were determined using US EPA Method 552.2. A Perkin Elmer Autosystem gas chromatograph (Perkin Elmer Instruments, Shelton, Conn.) equipped with an ECD, an autosampler, and a 30 m×0.32 mm I.D., 3 μm DB-1 column (J&W Scientific, Folsom, Calif.) was used for the analysis. The oven temperature was programmed to hold for 15 minutes at 32° C., then increased to 75° C. at a rate of 5° C./min and held 5 minutes, then increased to 100° C. at a rate of 5° C./min. The carrier flow (nitrogen) was 1.0 mL/min with the injector temperature and detector temperatures at 200° C. and 260° C., respectively.

Aldehydes, Ketones and Ketoacids

USEPA Method 556 (Munch, J. W., et al., Determination of carbonyl compounds in drinking water by pentafluorobenzylhydroxylamine derivatization and capillary gas chromatography with electron capture detection, Method 556.1, USEPA, Cincinnati, Ohio (1998)) was used to monitor formaldehyde, propionaldehyde, glyoxal, methyl glyoxal, acetone, and 2-butanone, ketomalonic acid, pyruvic acid and glyoxylic acid. A Perkin Elmer Autosystem gas chromatograph (Perkin Elmer Instruments, Shelton, Conn.) equipped with an ECD, an autosampler, and a 30 m×0.25 mm I.D., 0.5 μm DB-5ms column (J&W Scientific, Folsom, Calif.) was used in the analysis. The oven temperature was programmed to hold at 1 minute at 50° C., then increased to 220° C. at a rate of 4° C./min followed by an increase to 250° C. at a rate of 20° C./min with a 5 minute hold time. The carrier flow was 1.0 mL/min and the injector temperature and detector temperatures were 180° C. and 300° C., respectively.

Experiments

The ozone-filtration system used in these experiments is shown in FIG. 2. The operating conditions used are shown in Table 3.

Permeate samples were collected in bottles covered with parafilm and stored in an ice-bath throughout the duration of the experiment. The first 400 mL of permeate collected was labeled as P1 and latter 1000 ml as P2.

TABLE 3

Operating Conditions for the Ozone-Membrane Filtration System

| | |
| --- | --- |
| Water recirculation rate | 2.75 LPM |
| Water temperature | 20° C. |
| Ozone gas flow rate | 100 mL/min |
| TMP | 0.5 bar |
| Ozone dose | 2.5 g/m$^3$ |

Results and Discussion

Figure 3:
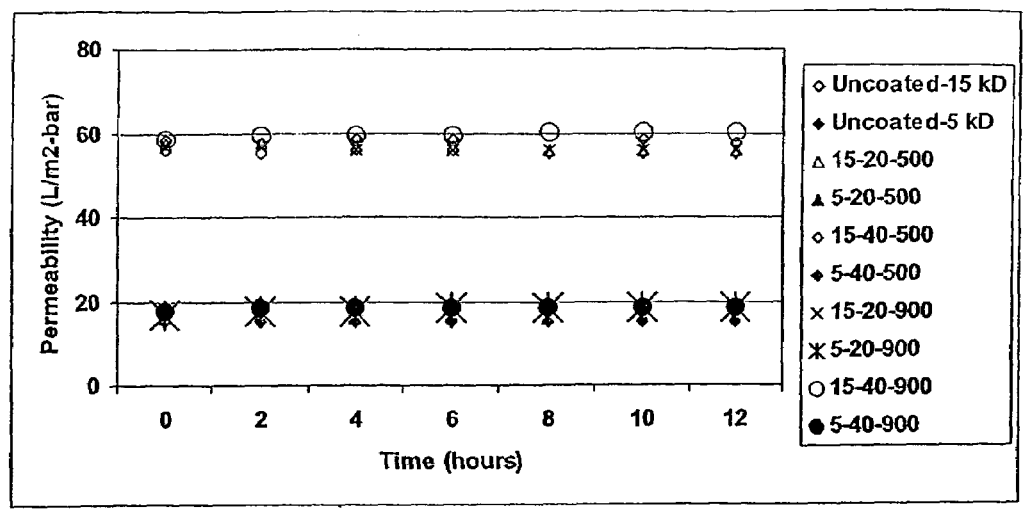
FIG. 3 is a graph showing permeate flux for different membrane coating modifications (Membrane Size; 5 and 15 κD; All values are average of triplicates within experiments and duplicate experiments. The values have a maximum std. deviation of 5%).

Experiments were conducted to determine the effect of the coating procedure on membrane permeability. As shown in FIG. 3, the coating of the membrane had little effect on the permeability of the membrane, suggesting that processing did not damage the integrity of the membrane and that at thicknesses of up to 40 layers the resistance of the iron oxide coating is comparatively small.

Figure 4:
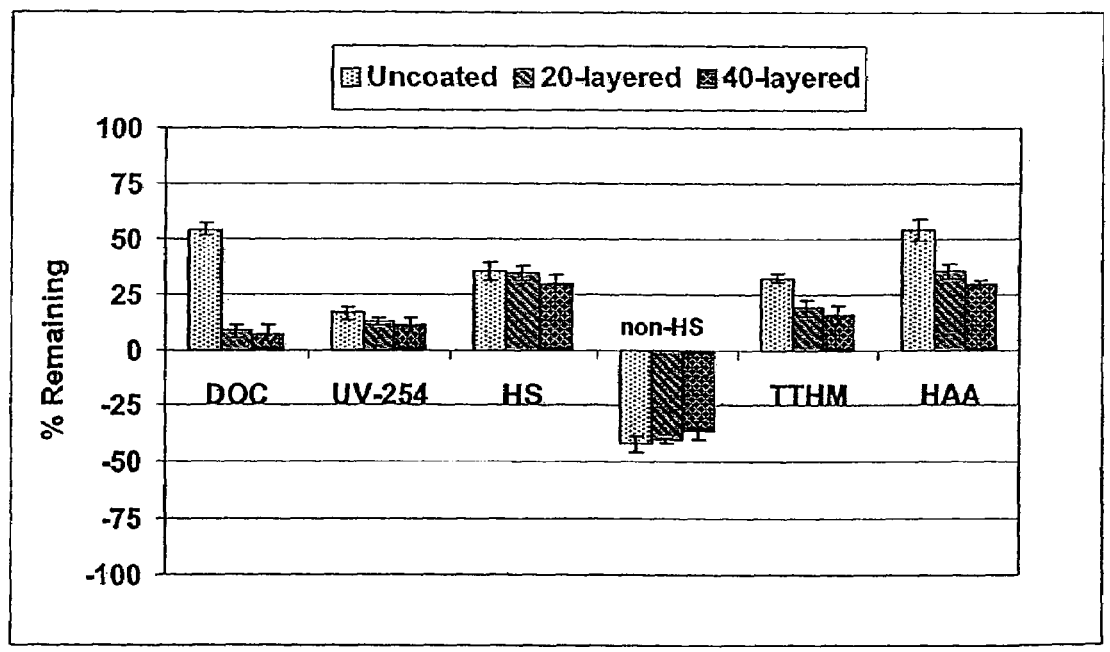
FIG. 4 is a graph showing the effect of number of catalyst layers on the permeate water quality (Membrane Size: 15 κD, 20 and 40 layers, oven baked at 500° C.; All values are averages of triplicates within experiments).

FIG. 4 shows that the reduction in the DOC concentration in P2 samples is greater for the coated membranes than for the uncoated membrane. As with all parameters measured, the results for P1 samples follow the same trends as observed with P2 samples. As such, only the data for P2 samples is presented in the figures. This reduction in DOC concentrations suggests that the iron oxide coating catalyzes the degradation of ozone to produce radical species, at the membrane surface, which degrade the NOM. There is little difference between the coated and uncoated membranes in the extent of the reduction of UV-254 absorbing compounds or humic substances. This suggests that the reduction in UV absorbing compounds and humic substances is due to solution phase ozonation rather than surface catalytic reactions. Consistent with the results showing little differences in the removal of humic substances, the concentration of non-humic substances formed is also similar for all three membranes studied.

Figure 5:
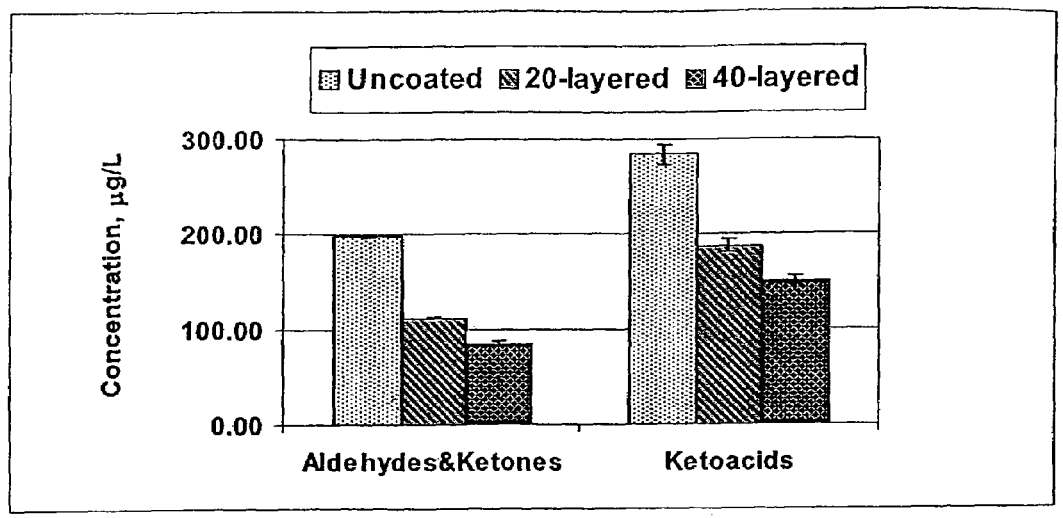
FIG. 5 is a graph showing the effect of number of catalyst layers on the concentration of ozonation by-products in the permeate (Membrane Size: 15 κD, 20 and 40 layers, oven baked at 500° C.; All values are average of triplicates within experiments).
Figure 6:
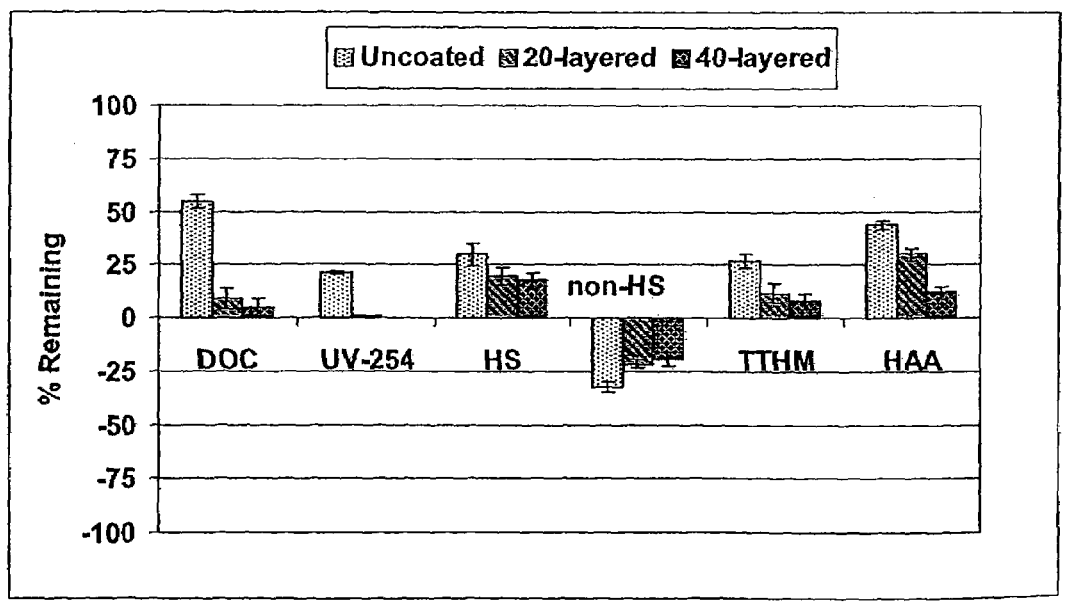
FIG. 6 is a graph showing the effect of the catalyst layers on the permeate water quality. (Membrane Size: 5 κD, 20 and 40 layers, oven baked at 500° C.; All values are averages of triplicates within experiments).
Figure 7:
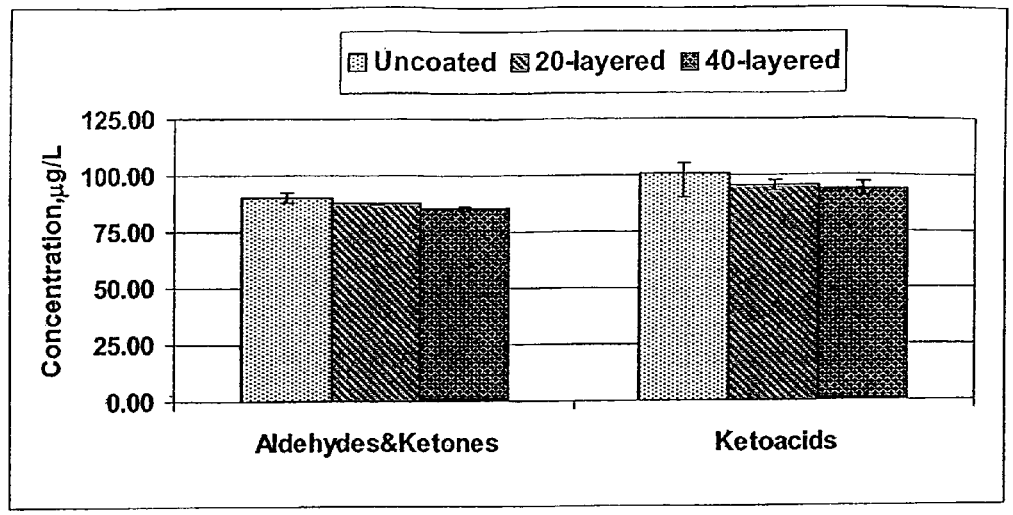
FIG. 7 is a graph showing the effect of the number of catalyst layers on the concentrations of ozonation by-products in the permeate. (Membrane Size: 5 κD, 20 and 40 layers, oven baked at 500° C.; All values are average of triplicates within experiments).
Figure 8:
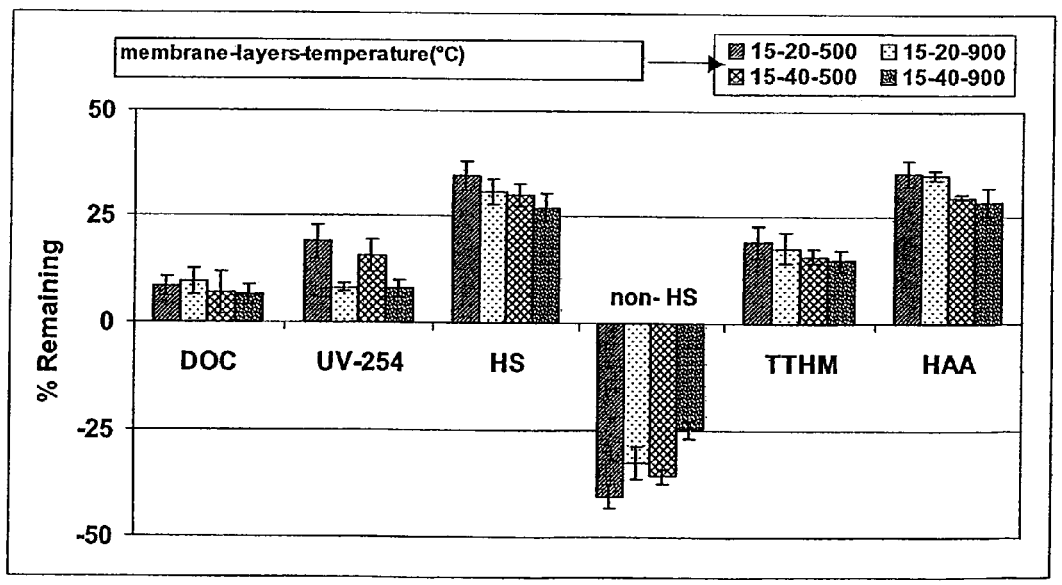
FIG. 8 is a graph showing the effect of sintering temperature on the permeate water quality. (Membrane Size: 15 κD, 20 and 40 layers, oven baked at 500° C. and sintered at 900° C.; All values are averages of triplicates within experiments).
Figure 9:
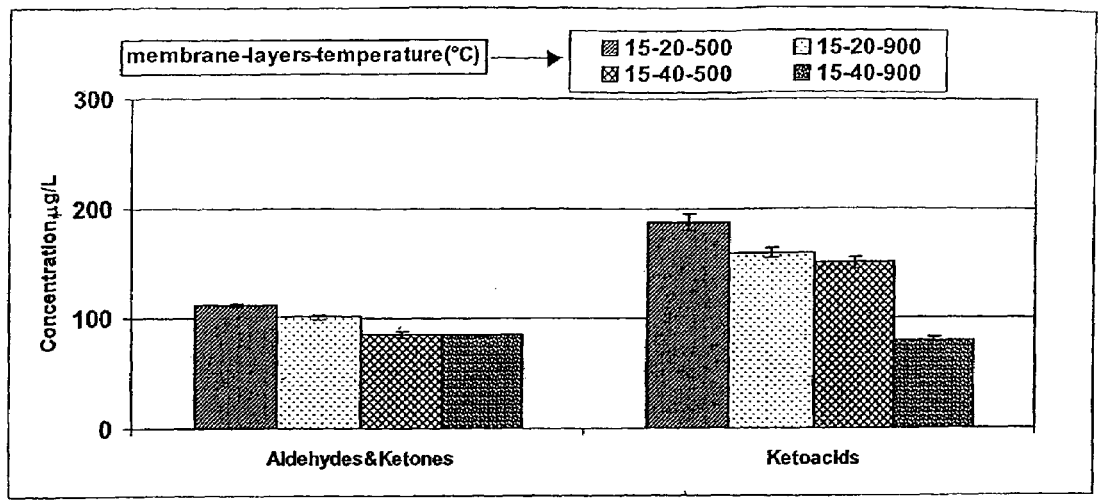
FIG. 9 is a graph showing the effect of sintering temperature on the concentrations of ozonation by-products in the permeate. (Membrane Size: 15 κD, 20 and 40 layers, oven baked at 500° C. and sintered at 900° C.; All values are average of triplicates within experiments).
Figure 10:
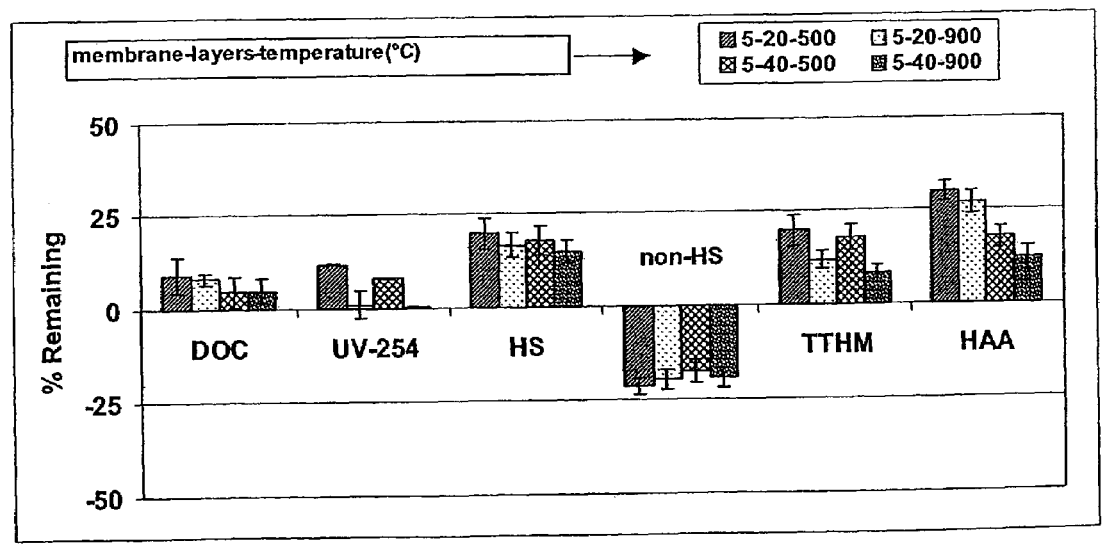
FIG. 10 is a graph showing the effect of sintering temperature on the permeate water quality. (Membrane Size: 5 κD, 20 and 40 layers, oven baked at 500° C. and sintered at 900° C.; All values are average of triplicates within experiments).
Figure 11:
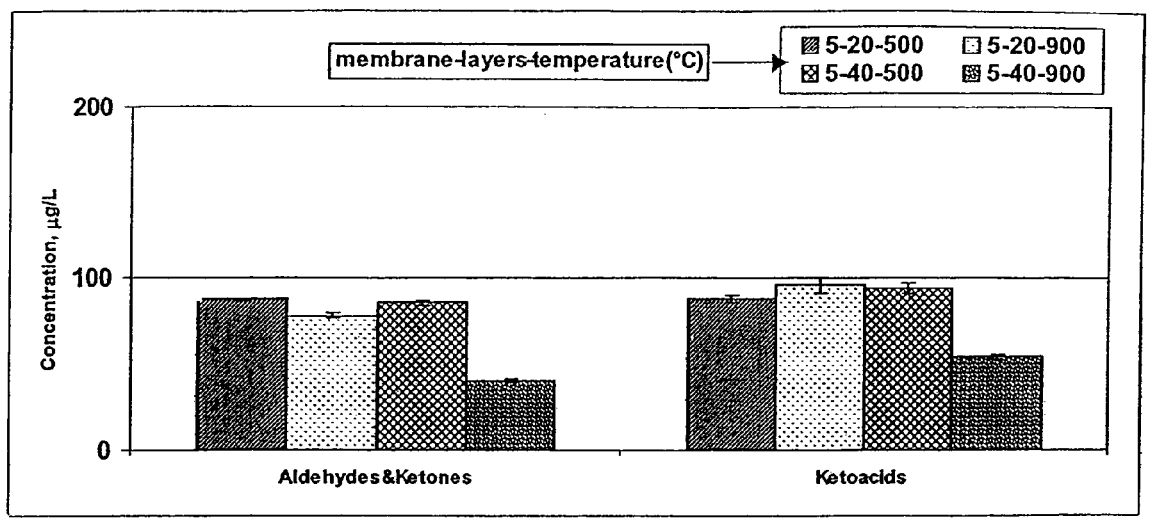
FIG. 11 is a graph showing the effect of sintering temperature on the concentrations of ozonation by-products in the permeate. (Membrane Size: 5 κD, 20 and 40 layers, oven baked at 500° C. and sintered at 900° C.; All values are average of triplicates within experiments).
Figure 12A:
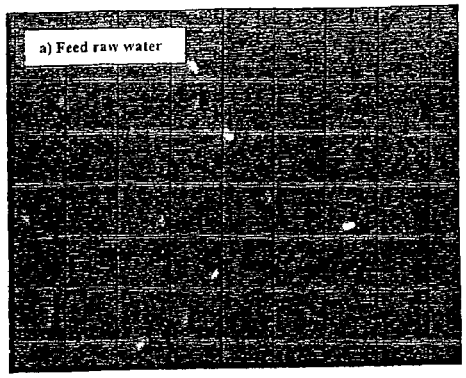
FIGS. 12 to 12F are fluorescence images indicating bacteria presence in the permeate after different treatments. (Membrane size: 5 κDa, gaseous ozone concentration 2.5 g/m$^3$, catalyst coated membrane: 40 layers of iron oxide nanoparticles coating sintered at 900° C. All values are the average of triplicates within experiments).
Figure 12B:
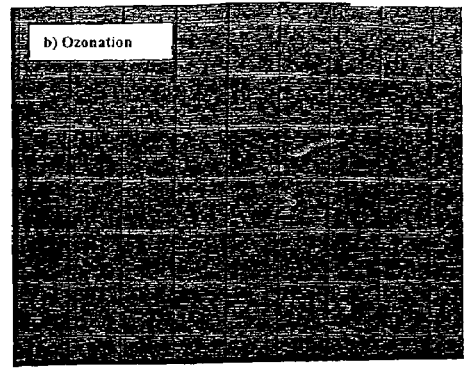
Figure 12C:
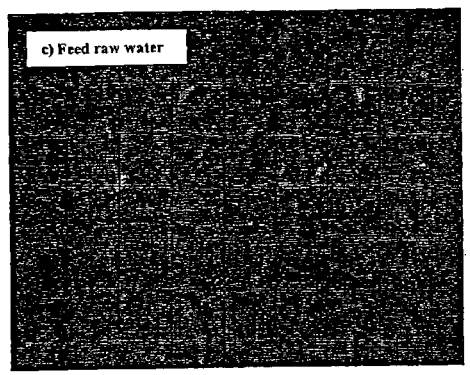
Figure 12D:
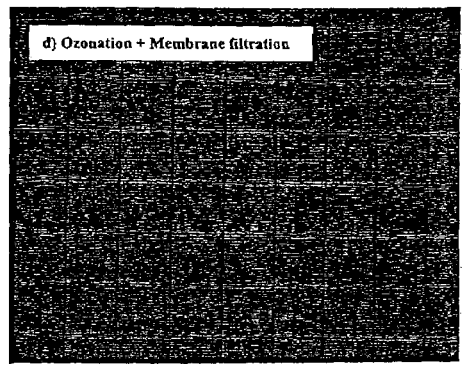
Figure 12E:
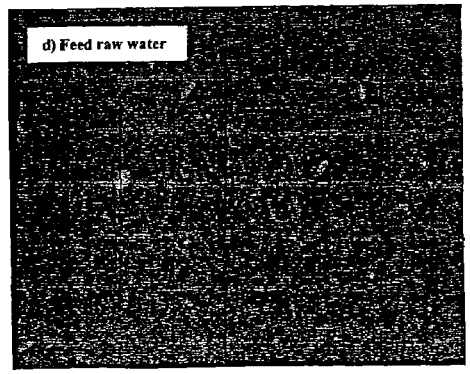
Figure 12F:
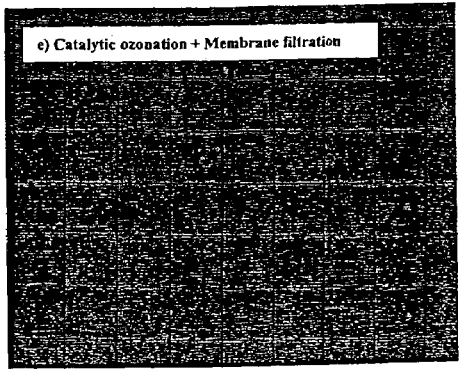
Figure 13:
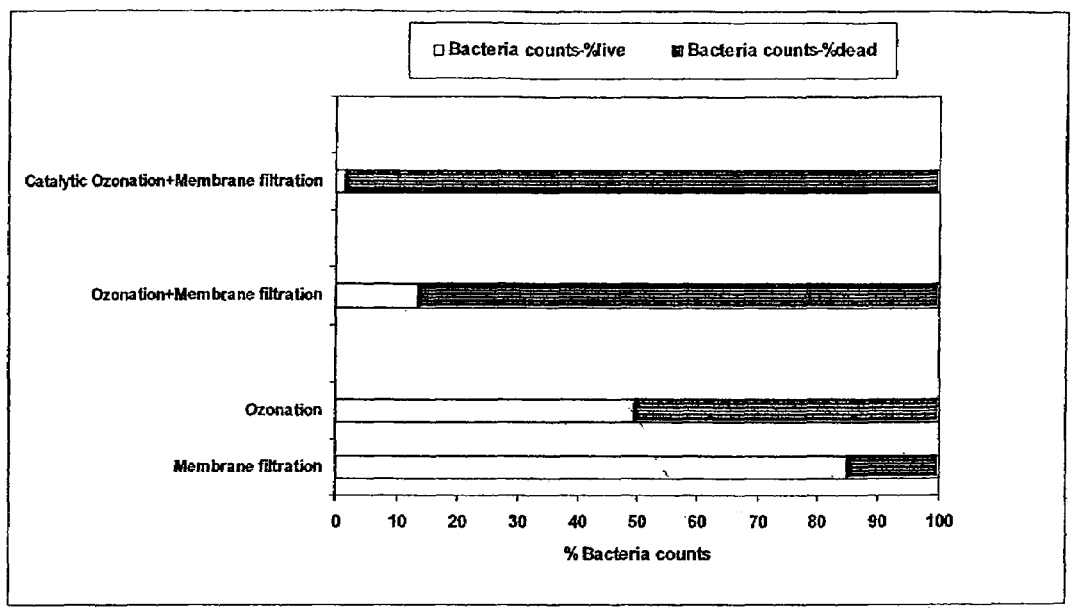
FIG. 13 is a graph showing percent of live-dead bacteria in the permeate after different treatments. (Membrane size: 5 κDa, gaseous ozone concentration 2.5 g/m$^3$, catalyst coated membrane: 40 layers of iron oxide nanoparticles coating sintered at 900° C. Fluorescence spectroscopy after staining with molecular probes. All values are the average of triplicates within experiments).
Figure 14A:
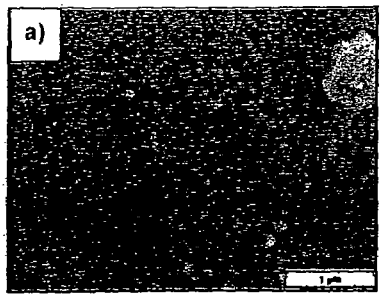
FIGS. 14A to 14F are SEM images of membrane surface before and after treatment. (SEM JEOL 6400V, accelerating voltage 15 κV, a-c) SEM images of an uncoated-unsintered membrane from the manufacturer, d-f) SEM images of a 40 layers coating of iron oxide nanoparticles sintered in air at 900° C.).
Figure 14B:
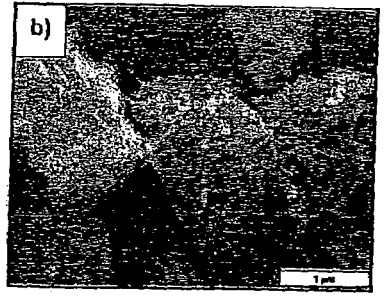
Figure 14C:
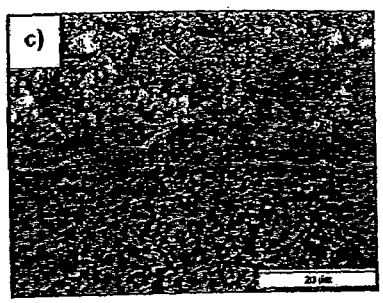
Figure 14D:
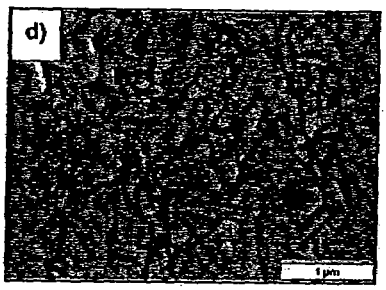
Figure 14E:
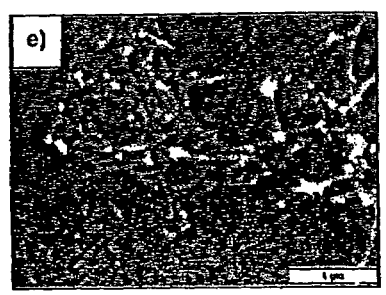
Figure 14F:
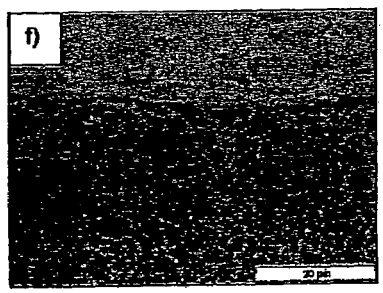
Figure 15:
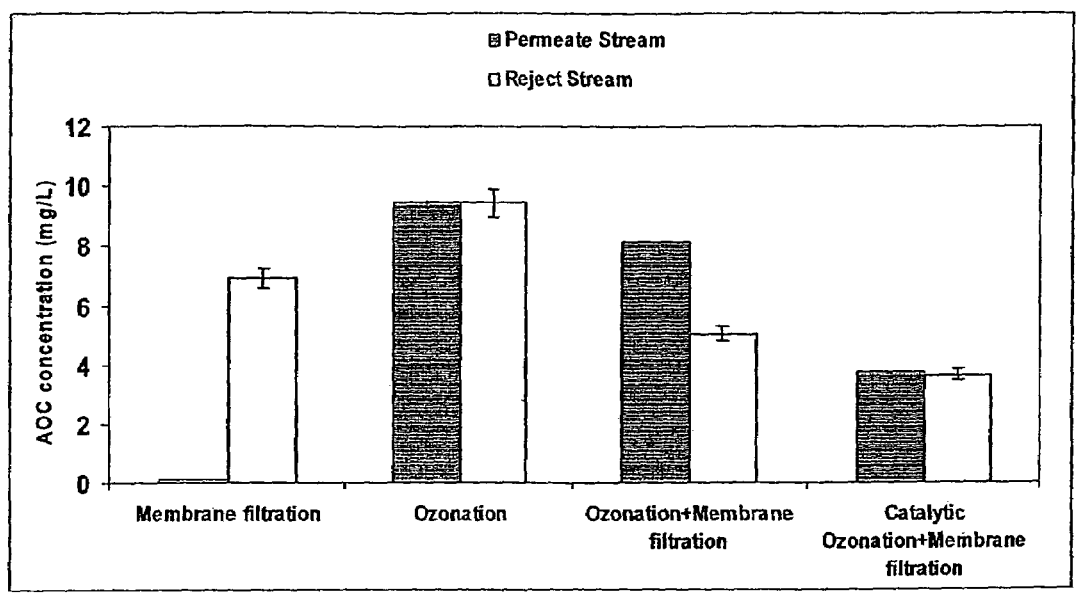
FIG. 15 is a graph showing assimilated organic carbon (AOC) concentration after different treatments for the permeate and reject streams. (Membrane Size: 5 κDa, gaseous ozone concentration 2.5 g/m$^3$, catalyst coated membrane: 40 layers of iron oxide nanoparticles coating sintered at 900° C. All values are the average of triplicates within experiments).

To extent to which the DBPs precursors are removed was greater with the coated membranes than with the uncoated membrane. The concentrations of TTHMs and HAAs were reduced by up to 90% and 8%, respectively, with ozonation combined with the iron oxide coated membranes. The concentrations of aldehydes, ketones and ketoacids formed with treatment using the coated membranes were also less than that obtained with the uncoated membrane (see FIG. 5). The coating of the membrane surface with iron oxide appears to catalyze reactions that lead to a reduction in DBPs and DBP precursors. Ozone may decompose on the active metal sites of the iron oxide surface, resulting in increased rates of hydroxyl radical production (Andreozzi, R., et al., *Appl. Catal. A,* 13175 (1998); Andreozzi, R., et al., *Water Res.,* 26 917 (1992); and Ma, J., et al., *Water Res.* 34 3822 (2000)), which in turn leads to a concomitant decrease in the concentration of disinfection by-products (DBP) and their precursors.

The effects of the number of iron oxide layers on NOM, DBPs and DBP precursors can be seen in FIGS. 4 to 7. Statistical analysis using ANOVA indicates that at the 95% confidence level, with the exception f the results for HAAs with a 5 kD membrane (see FIG. 6) and ozonation by-products with a 15 kD membrane (see FIG. 5), there is no statistically significant difference for the removal of NOM, DBPs or DBP precursors using the membranes coated with 20 or 40 layers of iron oxide particles.

To improve the adhesion of the coating to the membrane, several coated membranes were sintered at 900° C. The results for coated membranes treated at 500° C. and 900° C. are compared in FIGS. 8 to 11. A small decrease in the concentration of ozonation by-products was found when the higher sintering temperature was used. It is hypothesized that the higher temperature results in a greater degree of reduction in the concentration of the ozonation by-products. The sintering at higher temperatures alters the properties of the membrane surface, which further enhances its catalytic properties. TEM of these sintered surfaces is ongoing and will be followed by chemical and phase analysis of the membrane surface.

Standards for maximum DBP concentrations in drinking water are set by the US EPA under the Stage 2 Disinfection/Disinfection By-Product (D/DBP). The maximum contaminant levels for TTHMS and HAAs are 80 µg/L and 60 µg/L, respectively. Catalytic ozonation membrane filtration met regulatory limits for both contaminants, with concentrations of approximately 60 to 70 µg/L (±5% standard deviation) and 35 to 40 µg/L (±5% standard deviation) for TTHMs and HAAs, respectively, using a 5 kD MWCO membrane, coated with 20 layers of iron oxide and sintered at 900° C. This is especially significant because such limits are difficult to meet with poor quality waters, such as those used in this work.

Previous work has demonstrated using a 1 kD membrane and a gaseous ozone dosage of 2.5 g/m$^3$, we can meet the regulatory requirements for DBPs (Karnik, B. S., et al., Submitted for publication in Water Research). Comparable results could be obtained using iron oxide coated 5 kD membranes. As the permeability of the 5 kD membrane is three times greater than that of 1 kD membrane a significant decrease in the costs associated with process can be achieved using the coated membrane while still producing high quality water.

CONCLUSIONS

This work shows that a sintered iron oxide coating over an AZT ceramic membrane has considerable potential for reducing the formation of DBP and DBP precursor formation in the combined ozonation-membrane filtration process evaluated. The finished water showed significant improvement in the water quality as compared to that obtained with the uncoated membranes. The sintered iron oxide coating did not show any significant effect on the permeability of the membranes. Hydroxyl radicals produced at the iron oxide layered membrane surface as a result of ozone decomposition are believed to enhance the degradation of the NOM and reduce the concentration of DBPs precursors, resulting in a decrease in the concentration of DBPs formed. Increasing the number of layers of the catalyst did not result in a significant improvement in performance. Increasing the sintering temperature from 500° C. to 900° C. resulted in some improvement in the removal of the ozonation by-products. A 5 kD MWCO membrane, coated with 20 layers of iron oxide and sintered at 900° C. resulted in permeate water quality that met the pertinent regulatory requirements of the Stage 2 D/DBP Rule.

Tables 4 to 12 show the basic data for FIGS. 12 to 15.

TABLE 4

Experimental setup for the ozonation/membrane process.
Water Source: Lake Lansing, (Haslett, MI).
Operating Conditions: Continuous Ozonation, Water Flowrate: 2.75 LPM,
Gas Flowrate: 100 mL/min
Temperature: 20° C.
TMP 8 psi
pH 8.2, Ozone dose 2.5 g/m3
Feed Raw Water
Permeate 1 (First 400 ml of Permeate flux after ozonation) (4 hours)
Permeate 2 (Later 1000 ml of Permeate flux after ozonation) (8-9 hours)

| Parameters | Filtered raw water (Initial Concentration) | | Permeate 1 (% Reduction) | | Permeate 2 (% Reduction) | |
| --- | --- | --- | --- | --- | --- | --- |
| Membrane | Uncoated | Layered | Uncoated | Layered | Uncoated | Layered |
| pH† | 8.212 | 8.212 | 7.95 | 7.75 | 8.15 | 7.95 |
| UV-254 (Abs) | 0.163/0.001 | 0.165/0.001 | 63.8/3.27 | 63.03/4.1 | 83.44/2.8 | 87.27/1.78 |
| DOC (mg/L) | 10.28/0.05 | 10.28/0.05 | 27.52/4.17 | 55.05/2.22 | 45.87/2.89 | 91.74/2.67 |
| HS (mg/L) | 2.73/0.1 | 2.73/0.1 | 27.78/4.48 | 23.15/3.45 | 64.81/4.18 | 65.46/3.29 |
| NHS (mg/L)* | 5.09/0.2 | 5.09/0.2 | 34.09/1.56 | 40.82/2.88 | 57.97/3.67 | 59.54/1.45 |
| C1 demand (mg/L) | 10.64 | 10.64 | 6.67 | 33.33 | 40 | 53.33 |
| TTHMs (µg/L) | 234.67/2.69 | 234.67/2.69 | 23.67/4.55 | 34.23/3.79 | 67.83/2.11 | 81.23/3.51 |
| HAAs (µg/L) | 84.91/5.89 | 84.91/5.89 | 18.26/2.78 | 22.69/3.04 | 46.14/4.78 | 64.73/3.50 |
| *Aldehydes-Ketones (µg/L) | 5.28/1.08 | 5.28/1.08 | 38.26/2.39 | 35.49/1.16 | 198.34/5.78 | 112.49/8.79 |
| Ketoacids (µg/L)* | 1.87/0.54 | 1.87/0.54 | 178.27/10.17 | 154.28/7.29 | 284.2/9.01 | 187.25/10.23 |

All values are within 5% std. deviation
†pH values are actual pH measured in the samples
*NHS, Aldehydes, ketones and ketoacids increase in P1 and P2. Also the P1 and P2 values are actual concentrations of these compounds.

TABLE 5

| P1-data | UV254 | DOC | HS | NHS | TTHM | HAA |
|---|---|---|---|---|---|---|
| Uncoated | 63.8 | 27.52 | 27.78 | −34.09 | 23.67 | 18.26 |
| Coated | 63.03 | 55.05 | 23.15 | −40.82 | 34.23 | 22.69 |

TABLE 6

| P2-data | UV254 | DOC | HS | NHS | TTHM | HAA |
|---|---|---|---|---|---|---|
| Uncoated | 83.44 | 45.87 | 64.81 | −57.97 | 67.83 | 46.14 |
| Coated | 87.27 | 91.74 | 65.46 | −59.54 | 81.23 | 64.74 |

TABLE 7

| | P1-Aldehydes | P1-Ketoacids | P2-Aldehydes | P2-Ketoacids |
|---|---|---|---|---|
| Uncoated | 38.26 | 178.27 | 198.34 | 284.20 |
| Coated | 35.49 | 154.28 | 112.49 | 187.25 |

TABLE 8

| Std dev P1-data | UV254 | DOC | HS | NHS | TTHM | HAA |
|---|---|---|---|---|---|---|
| Uncoated | 3.27 | 4.17 | 4.48 | 1.56 | 4.55 | 2.78 |
| Coated | 4.1 | 2.22 | 3.45 | 2.88 | 3.79 | 3.04 |

TABLE 9

| Std dev P2-data | UV254 | DOC | HS | NHS | TTHM | HAA |
|---|---|---|---|---|---|---|
| Uncoated | 2.8 | 2.89 | 4.18 | 3.67 | 2.11 | 4.78 |
| Coated | 1.78 | 2.67 | 3.29 | 1.45 | 3.51 | 3.5 |

TABLE 10

| Std dev | P1-Aldehyde | P1-Ketoacid | P2-Aldehyde | P2-Ketoacids |
|---|---|---|---|---|
| Uncoated | 2.39 | 10.17 | 5.78 | 8.79 |
| Coated | 1.16 | 7.29 | 8.79 | 10.23 |

TABLE 11

Dip Coating Method

| Concentration for dip coating (All membranes are 15 kD) | Result |
|---|---|
| 10 volume % Hematite solution (only used once) | Permeability was very low |
| 1 volume % Maghemite solution | Permeability was very low |
| 0.5 volume % Maghemite solution (once oven baked instead of sintered) | Permeability increased possibly due to cracking |
| 0.05 volume % Maghemite solution (sintered) | Permeability increased possibly due to cracking |

After sintering the Maghemite appears to have decomposed to Hematite (based on visible morphology changes, and loss of all magnetic behavior, even in the presence of a relatively strong magnet). Maghemite is anhydrous iron oxide $\gamma Fe_2O_3$ which has a defect spinel structure with a hematite stoichiometry. It also exists in the $\alpha\ Fe_2O_3$ polymorph. Maghemite has a cation vacancy, so its structure is more accurately written as $Fe_3(Fe_5\text{-}O_{12})$. It is highly ferromagnetic, and does not lose its magnetism easily upon contact. However, it is weak enough to be fairly easily realigned. It is the coating used on floppy disks and cassettes. It forms when iron minerals rust. Hematite is the anhydrous iron oxide $\alpha\ Fe_2O3$ which has a corundum structure. It is common in nature, and is an important ore of iron. It is also used in making red paint pigment.

TABLE 12

Layer by Layer Method

| No. | Membrane combinations | Result |
|---|---|---|
| 1 | 15 kD membrane - 20 layers - oven baked at 500° C. | Permeability was almost identical to uncoated 15 kD membrane |
| 2 | 15 kD membrane - 40 layers - oven baked at 500° C. | Permeability was almost identical to uncoated 15 kD membrane |
| 3 | 15 kD membrane - 20 layers - sintered at 900° C. | Permeability was almost identical to ovenbaked 15 kD membranes at 500° C. |
| 4 | 15 kD membrane - 40 layers - sintered at 900° C. | Permeability was almost identical to ovenbaked 15 kD membranes at 500° C. |
| 5 | 5 kD membrane - 20 layers - ovenbaked at 500° C. | Permeability was almost identical to uncoated 5 kD membrane |
| 6 | 5 kD membrane - 40 layers - ovenbaked at 500° C. | Permeability was almost identical to uncoated 5 kD membrane |
| 7 | 5 kD membrane - 20 layers - sintered at 900° C. | Permeability was almost identical to ovenbaked 5 kD membranes at 500° C. |
| 8 | 5 kD membrane - 40 layers - sintered at 900° C. | Permeability was almost identical to ovenbaked 5 kD membranes at 500° C. |

REFERENCES

K. J. McKenzie, F. Marken, M. Hyde, and R. G. Compton, "Nanoporous ironoxide membranes: layer-by-layer deposition and electrochemical characterization of processes within nanopores." New J. Chem. 26, 625-629 (2002).

P. Mulvaney, R. Cooper, F. Grieser, and D. Meisel, "Charge trapping in the reductive dissolution of colloidal suspensions of Iron (III) oxides." Langmuir, 4, 1206-1211 (1988).

It is intended that the foregoing description be only illustrative of the present invention and that the present invention be limited only by the hereinafter appended claims.

We claim:

1. A composite material for purification and filtration of water containing ozone and organic matter which comprises:
    (a) a microporous to mesoporous inert ceramic filter with a surface; and
    (b) multilayers of a nanocrystalline, sintered ceramic metal oxide catalyst membrane coating on the surface of the ceramic filter,
    wherein the multilayers of the metal oxide catalyst coating are formed by applying a coating layer of metal oxide to the surface of the filter followed by a coating layer of phytic acid and repeated by alternating between the metal oxide layer and the phytic acid layer to form at least 20 layers of metal oxide, followed by sintering of the coating multilayers,
    wherein the metal oxide catalyst coating in use degrades the ozone in the water into hydroxyl or other radicals in situ which react with the organic matter in the water resulting in the removal of the organic matter by the composite ceramic membrane during filtration, and
    wherein the metal oxide is selected from the group consisting of titanium oxide and manganese oxide.

2. The composite material of claim 1 wherein the ceramic filter has been coated with a metal oxide or metal hydroxide, which has been dried to a metal oxide to provide the catalyst on the membrane.

3. The composite material of claim 1 wherein the membrane has a molecular weight cutoff for organic matter of 1,000 Da or more.

4. The composite material of claim 1 wherein the ceramic filter has a pore size of between about 0.001 and 50 micrometers.

5. A method for forming the composite of claim 1 which comprises:
    (a) providing the microporous to mesoporous inert ceramic filter with the first surface;
    (b) coating the ceramic filter or the surface with a first of the layers of the multi-layered, nanocrystalline, sintered, ceramic metal oxide catalyst by depositing on the filter surface a suspension of a metal oxide or metal hydroxide or ceramic oxide to form the catalyst followed by coating a layer of phytic acid on the layer of metal oxide, wherein the steps of applying metal oxide and phytic acid are repeated to form at least 20 layers of the metal oxide,
    (c) sintering the at least 20 layers of the metal oxide and phytic acid layers to adhere the metal oxide or ceramic oxide to the filter surface as the catalyst.

6. The method of claim 5 wherein the coating is produced by heating a metal oxide as the precursor coating on the surface of the ceramic filter.

7. The method of claim 5 or 6 wherein the membrane is produced with a molecular weight cutoff for the organic matter of 1,000 Da or more.

8. The method of claim 5 or 6 wherein the ceramic filter has a pore size between about 0.001 and 50 micrometers.

9. The method of claim 5 wherein the repeating of step (c) is continued to produce up to 40 layers of the catalyst.

10. The composite of claim 1, further comprising between 20 and 40 layers of the nanocrystalline, sintered ceramic metal oxide catalyst membrane coating.

11. The composite of claim 1 wherein the sintering of the layers is between a temperature of 500° C. and 900° C.

12. The composite of claim 1, wherein the catalyst coating comprises 40 layers of the metal oxide and the sintering of the layers is at a temperature of 900° C.

13. The composite of claim 1, wherein the membrane is adapted to allow for permeability at a molecular weight cutoff of 5 kilo-Daltons (kD) or more.

* * * * *

UNITED STATES PATENT AND TRADEMARK OFFICE
CERTIFICATE OF CORRECTION

PATENT NO. : 7,578,939 B2
APPLICATION NO. : 11/294812
DATED : August 25, 2009
INVENTOR(S) : Susan J. Masten et al.

It is certified that error appears in the above-identified patent and that said Letters Patent is hereby corrected as shown below:

Column 17, line 6, "approximately 11 cm2" should be --approximately 11 $cm^2$--.

Column 24, line 35, "$Fe_2O3$" should be --$Fe_2O_3$--.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,578,939 B2  
APPLICATION NO. : 11/294812  
DATED : August 25, 2009  
INVENTOR(S) : Susan J. Masten et al.

Page 1 of 1

It is certified that error appears in the above-identified patent and that said Letters Patent is hereby corrected as shown below:

In the Specification

In column 1, lines 14-16, please delete:

"This invention was developed under a grant from the U.S. Environmental Protection Agency Grant No. RD830090811. The U.S. Government has certain rights in the invention."

and insert:

-- This invention was made with government support under RD83090801 awarded by the Environmental Protection Agency. The government has certain rights in the invention. --

Signed and Sealed this  
Twenty-fifth Day of February, 2014

Michelle K. Lee  
*Deputy Director of the United States Patent and Trademark Office*